(12) United States Patent
Tieu

(10) Patent No.: US 7,502,324 B1
(45) Date of Patent: Mar. 10, 2009

(54) TCP RETRANSMISSION AND EXCEPTION PROCESSING IN HIGH SPEED, LOW MEMORY HARDWARE DEVICES

(75) Inventor: Francis Tieu, Duluth, GA (US)

(73) Assignee: NTH IP Corporation, Atlanta, GA (US)

( * ) Notice: Subject to any disclaimer, the term of this patent is extended or adjusted under 35 U.S.C. 154(b) by 620 days.

(21) Appl. No.: 11/018,093

(22) Filed: Dec. 20, 2004

Related U.S. Application Data

(60) Provisional application No. 60/583,310, filed on Jun. 28, 2004.

(51) Int. Cl.
*G01R 31/08* (2006.01)
*G06F 11/00* (2006.01)
*G06F 15/173* (2006.01)
*G08C 15/00* (2006.01)
*H04J 1/16* (2006.01)
*H04J 3/14* (2006.01)
*H04L 1/00* (2006.01)

(52) U.S. Cl. .................. 370/235; 370/238; 709/239

(58) Field of Classification Search ......... 370/235–237, 370/238; 714/748, 749; 709/239, 240, 224, 709/232

See application file for complete search history.

(56) References Cited

U.S. PATENT DOCUMENTS

| 6,934,257 | B2 * | 8/2005 | Liu et al. ............. 370/236 |
| 2004/0044796 | A1 * | 3/2004 | Vangal et al. ......... 709/250 |
| 2005/0063303 | A1 * | 3/2005 | Samuels et al. ........ 370/229 |
| 2005/0149632 | A1 * | 7/2005 | Minami et al. ......... 709/237 |

OTHER PUBLICATIONS

Richard Stenvens, "UNIX Network Programming", 1990, p. 286.*

* cited by examiner

*Primary Examiner*—Seema S Rao
*Assistant Examiner*—Jianye Wu
(74) *Attorney, Agent, or Firm*—Brian Anderson

(57) ABSTRACT

A method and system for the retransmission of TCP segments in a high speed, low memory TOE device or processor system uses one or more selective context duplication (SCD) TCP/IP connections to provide retransmission assistance to an original TCP/IP connection. SCD connections are used only to retransmit TCP segments on behalf of the system. The original connection and SCD connections are linked together and managed using a TCP state engine in such a way that the original connection receives and processes acknowledgements (ACKs) and selective acknowledgements (SACKs) transmitted back to the system. In many applications, the original connection is able to continue transmitting even while the SCD connection is retransmitting.

34 Claims, 24 Drawing Sheets

| Cloning Parameters | Bit size | Descriptions |
|---|---|---|
| cpe_ts_recent | 32 | Time stamp Recent for timestamp echo |
| cpe_rcv_nxt | 32 | Next expected sequence number on the received side. This value is used for acknowledgement for transmit side |
| cpe_rmt_offer_win | 32 | Remote offer window. This value is no longer remote offer window during retransmission. This value becomes the total data for retransmission for that partiular retransmission irteration |
| cpe_lcl_offer_win | 32 | Local offer window, this value is used to advertised local buffer size that the local unit can accept |
| cpe_outoforder_rec | 32 | Out of order sequence number for SACK region 1 when SACK option is on. |
| cpe_outoforder_tail_rec | 32 | Tail end sequence number for SACK region 1 when SACK option is on. |
| cpe_snd_una | 32 | Send unacknowledge sequence number. The sequence number of the data byte that remote unit captured. During retransmission, this parameter is moved to where the retransmission starting byte sequence number |
| cpe_cwnd | 32 | Congestion window parameter |
| cpe_ssthresh | 32 | Slow Start threshold parameter for window calculations |
| cpe_cnn_stat | 32 | Connection configuration and option set up bit information such as Timestamp option on, SACK option on, connection is used for retransmission or normal transmission |
| cpe_mss | 16 | Maximum Segment Size |
| cpe_dfit_lclwin_wo_scl | 16 | Default local offer window before scale |
| cpe_sent_max | 32 | This value is moved to where the retransmission starting byte sequence number, which equals cpe_snd_una initially before retransmission start. The value is updated by hardware afterward |
| cpe_appl_init_seq | 32 | This value is moved to where the retransmission starting byte sequence number, which equals cpe_snd_una initially before retransmission start. The value is updated by hardware afterward |
| cpe_outoforder_inqueue_mtx | 1 | Transmit SACK region valid. The value is used to insert SACK option into transmitting segments if SACK option is on. |
| TCP Source Port | 16 | TCP connection Source port number |
| TCP Destination Port | 16 | TCP connection Destination port number |
| IP source | 32 | IP source address |
| IP Destination | 32 | IP destination address |
| MAC source address | 48 | Ethernet MAC source address |
| MAC destination address | 48 | Ethernet MAC destination address |

FIG. 10

| Cpe_cnn_stat - connection status CPE<br>Address bits [21:0]: 0x00_0024 For Connection 0<br>Cycle Type: R/W | | |
|---|---|---|
| [31:25] | NA | Spare bits |
| [24] | None iSCSI hardware owned connection. | The connection is owned by an application other than iSCSI and is accelerated by hardware. TCP segments are chained together on the receive side for handling off to application layer |
| [23:20] | Local offer window scale | TCP connection local offer window scale. Maximum number is 14, default is 0's. TCP internal system caps this value at maximum of 14 even though 15 can be written into memory. |
| [19:16] | remote offer window scale | TCP connection remote offer window scale. Maximum number is 14, default is 0's. TCP internal system caps this value at maximum of 14 even though 15 can be written into memory. |
| [15:14] | NA | |
| [13] | NA | |
| [13:12] | Rexmit_cnn | This connection is for retransmission. Used as SCD connection |
| [11] | NA | |
| [10] | Sw own cnn | Complete software owned connection |
| [9:7] | | Firmware reserved TCP substates[2:0] |
| [6] | SACK option on | SACK option on |
| [5] | Disable FIN sequence increment | Disable FIN sequence increment for FIN retransmission operation. |
| [4] | Timestamp option on | Time stamp option on |
| [3:0] | TCP operation states | TCP operation state: Receive processor processes:<br>  Established state (4 Hex),<br>  Close Wait (5 Hex),<br>  Last Ack (6 Hex),<br>  Fin Wait 1 (7 Hex),<br>  Fin Wait 2 (8 Hex).<br>Closing (9 Hex)<br><br>The following states will not be accelerated by hardware:<br>Connection Closed (0 Hex.)<br>Listen (1 Hex)<br>Syn received (2 Hex)<br>Syn Sent (3 Hex)<br>Time Wait (A Hex). |

FIG. 11

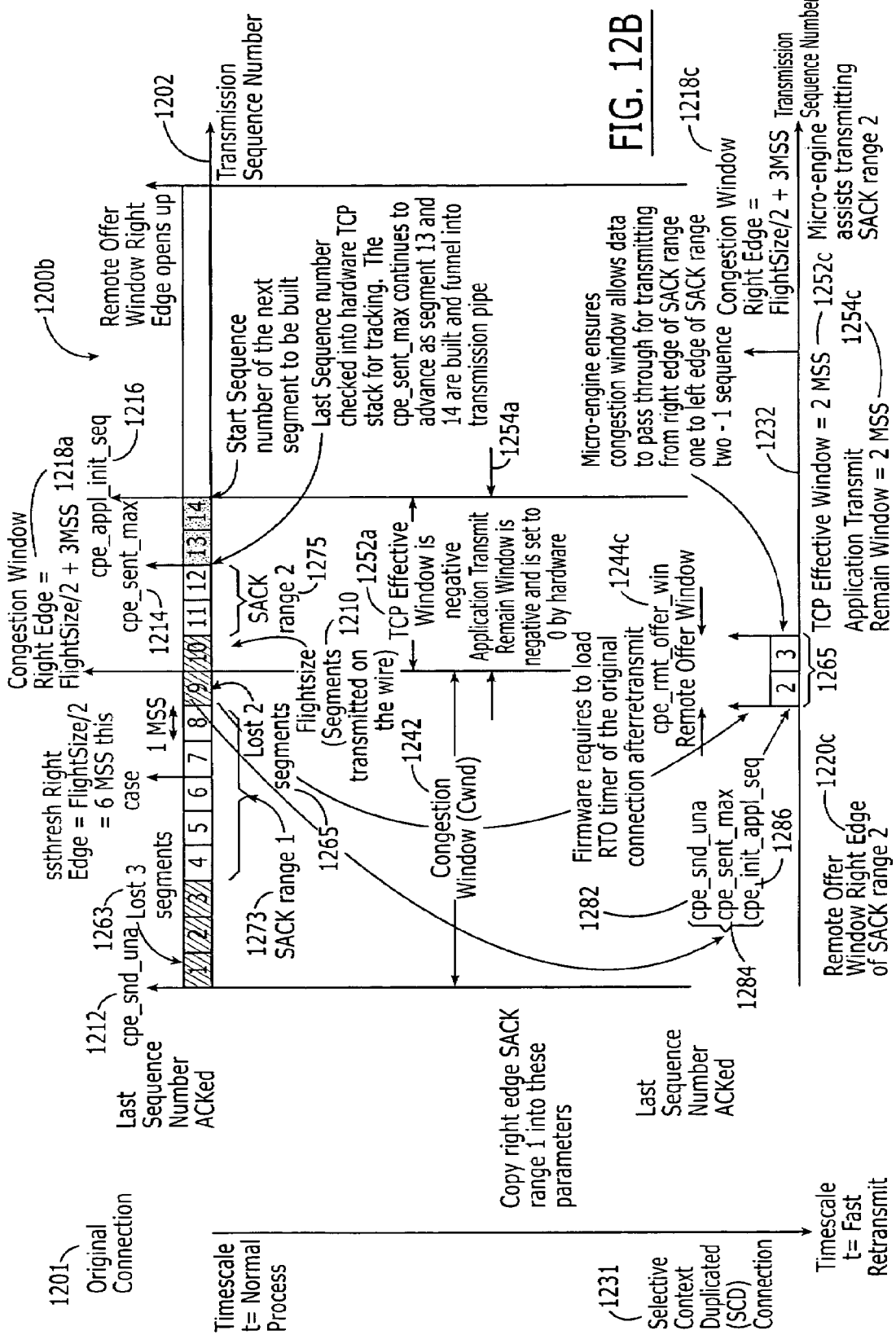

FIG. 17

| 1700 → | Input TCP connection parameters required for Transmission window calculator | |
|---|---|---|
| 32 bits | rmt_offer_wind | Registered Remote offer window. |
| 16 bits | mssd | Registered maximum sigment size |
| 32 bits | snd_unad | Ack sequence number |
| 32 bits | cwnd | Congestion window |
| 1 bit | silly_window_force_mtxd | Silly window time out counter expired signal |
| 32 bits | init_seqd | Segmentation start sequence number of the next first new segment to be built. This temporary parameter is used by local segmentation unit. |
| 1 bit | rexmit_cnn | Retransmission connection identification |

FIG. 18

| 1900 → | Output of transmission window calculator with 2 clock cycle pipeline | |
|---|---|---|
| 32 bits | Appl_xmit_remain_win | Window that segment builder could transmit. |
| 16 bits | Mss3d | Registered maximum segment size that this connection will use (3rd register) |
| 1 bit | silly_window_chk_in | Silly window check in if segment is built |
| 32 bits | Init_seq3d | Segmentation start sequence of the next first new segment to be built. (3rd register) |
| 1 bit | rexmit_cnn2d | Retransmission connection identification (2nd register) |

| Output of transmission window calculator with 3 clock cycle pipeline | |
|---|---|
| 32 bits | Appl_xmit_remain_win | Window that segment builder could transmit. |
| 16 bits | Mss2d | Registered maximum segment size that this connection will use. (2nd register) |
| 1 bit | silly_window_chk_in | Silly window check in if segment is built |
| 32 bits | init_seq2d | Segmentation start sequence of the next first new segment to be build |
| 1 bit | rexmit_cnnd | Retransmission connection identification |

FIG. 19

| Output of transmission window calculator without pipeline | |
|---|---|
| 32 bits | Appl_xmit_remain_win | Window that segment builder could transmit. |
| 16 bits | Mssd | Registered maximum segment size that this connection will use. (2nd register) |
| 1 bit | silly_window_chk_in | Silly window check in if segment is built |
| 32 bits | Init_seqd | Segmentation start sequence of the next first new segment to be built |
| 1 bit | rexmit_cnn | Retransmission connection identification (2nd register) |

FIG. 20

TCP RETRANSMISSION AND EXCEPTION PROCESSING IN HIGH SPEED, LOW MEMORY HARDWARE DEVICES

CROSS REFERENCE TO RELATED APPLICATION

This application claims the benefit under 35 U.S.C. § 119(e) of U.S. provisional patent application No. 60/583,310, entitled "TOE METHODS AND SYSTEMS," filed Jun. 28, 2004, which is incorporated herein in its entirety by reference.

FIELD OF THE PRESENT INVENTION

The present invention relates generally to computer communication systems and protocols, and, more particularly, to methods and systems for TCP retransmission and exception processing in high speed, low memory TCP dedicated hardware devices.

BACKGROUND OF THE PRESENT INVENTION

TCP/IP is a protocol system—a collection of protocols, rules, and requirements that enable computer network communications. At its core, TCP/IP provides one of several universally-accepted structures for enabling information or data to be transferred and understood (e.g., packaged and unpackaged) between different computers that communicate over a network, such as a local area network (LAN), a wide area network (WAN), or a public-wide network, such as the Internet.

The "IP" part of the TCP/IP protocol stands for "Internet protocol" and is used to ensure that information or data is addressed, delivered, and routed to the appropriate entity, network, or computer system. In contrast, "TCP," which stands for "transport control protocol," ensures that the actual content of the information or data that is transmitted is received completely and accurately. To ensure such reliability, TCP uses extensive error control and flow control techniques. The reliability provided by TCP, however, comes at a cost—increased network traffic and slower delivery speeds—especially when contrasted with less reliable but faster protocols, such as UDP ("user datagram protocol").

A typical network 100a is illustrated in FIG. 1A and includes at least two remote machines in communication with each other over a communications medium. Specifically, as shown, one machine 110 is a sending computer, server, or system (which we will arbitrarily designate as the "source machine" or TCP processor system) that communicates over a communications medium or network, such as the Internet 150, with another machine 160, which is the receiving computer, server, or system (which we will arbitrarily designate as the "destination machine" or TCP receiver system). Data or information typically travels in both directions 120, 130 between the source machine 110 and the destination machine 160 as part of a normal electronic communication.

In more complex computer networks, such as network 100b as illustrated in FIG. 1B, one server 115 acts as a source machine on behalf of numerous computers 111 networked with the server 115 that communicate over the communications medium or network 150, with other servers 165, each with their own networked computers 185, 186, 187. Server 115 also communicates with other standalone computers 175. Data or information typically travels in both directions on communication lines 125 between source machines and destination machines as part of normal electronic communications.

It is helpful to understand that the TCP/IP protocol defines discrete functions that are to be performed by compliant systems at different "layers" of the TCP/IP model. As shown in FIG. 2, the TCP/IP model 200 includes four layers, namely, the network access layer 210, the internet layer 220, the transport layer 230, and the application layer 240. Each layer is intended to be independent of the other layers, with each layer being responsible for different aspects of the communication process. For example, the network access layer 210 provides a physical interface with the physical network and formats data for the transmission medium, addresses data based on physical hardware addresses, and provides error control for data delivered on the physical network. Among other things, the internet layer 220 provides logical, hardware-independent addressing to enable data to pass between systems with different architectures. The transport layer 230 provides flow control, error control, and acknowledgment services, and serves as an interface for network applications. The application layer 240 provides computer applications for network troubleshooting, file transfer, remote control, and Internet activities.

According to TCP/IP protocol, each layer plays its own role in the communications process. For example, out-going data from the source machine is packaged first at the application layer 240, and then it is passed down the stack for additional packaging at the transport layer 230, the internet layer 220, and then finally the network access layer 210 of the source machine before it is transmitted to the destination machine. Each layer adds its own header (and/or trailer) information to the data package received from the previous higher layer that will be readable and understood by the corresponding layer of the destination machine. Thus, in-coming data received by a destination machine is unpackaged in the reverse direction (from network access layer 210 to application layer 240), with each corresponding header (and/or trailer) being read and removed from the data package by the respective layer prior to being passed up to the next layer.

The process 300 of encapsulating data at each successive layer is illustrated briefly in FIG. 3. For example, out-going user data 305 is packaged by a computer application 341 to include application header 345. The data package 340 created by the application 341 is called a "message." The message 340 (also shown as application data 342) is further encapsulated by a TCP manager 331 to include TCP header 335 (note: for purposes of the present invention and discussion, the transport layer is TCP rather than another protocol, such as UDP). The data package 330 created by the TCP manager 331 is called a "segment." The segment 330 is encapsulated further by the IP manager 321 to include IP header 325. The data package 320 created by the IP manager 321 is called a "datagram." The datagram 320 is encapsulated yet further by an Ethernet driver 311 (at the network access layer) to include Ethernet header 315 and Ethernet trailer 316. The data package 310 created by the Ethernet driver 311 is called a "frame." This frame 310 is a bitstream of information that is transmitted, as shown in FIG. 1, across the communications medium 150 from the source machine 110 to the destination machine 160. As stated previously, the process at the destination machine 160 of unpacking each data package occurs, by layer, in the reverse order.

It should be understood that the amount of data that needs to be transmitted between machines often exceeds the amount of space that is feasible, efficient, or permitted by universally-accepted protocols for a single frame or segment. Thus, data to be transmitted and received will typically be divided into a plurality of frames (at the IP layer) and into a plurality of segments (at the TCP layer). TCP protocols provide for the sending and receipt of variable-length segments of information enclosed in datagrams. TCP protocols provide for the proper handling (transmission, receipt, acknowledgement, and retransmission) of segments associated with a given communication.

At its lowest level, computer communications of data packages or packets of data are assumed to be unreliable. For example, packets of data may be lost or destroyed due to transmission errors, hardware failure or power interruption, network congestion, and many other factors. Thus, the TCP protocols provide a system in which to handle the transmission and receipt of data packets in such an unreliable environment. For example, based on TCP protocol, a destination machine is adapted to receive and properly order segments, regardless of the order in which they are received, regardless of delays in receipt, and regardless of receipt of duplicate data. This is achieved by assigning sequence numbers (left edge and right edge) to each segment transmitted and received. The destination machine further acknowledges correctly received data with an acknowledgment ("ACK") or a selective acknowledgment ("SACK") back to the source machine. An ACK is a positive acknowledgment of data up through a particular sequence number. By protocol, an ACK of a particular sequence number means that all data up to but not including the sequence number ACKed has been received. In contrast, a SACK, which is an optional TCP protocol that not all systems are required to use, is a positive acknowledgement of data up through a particular sequence number, as well as a positive acknowledgment of up to 3-4 "regions" of non-contiguous segments of data (as designated by their respective sequence number ranges). From a SACK, a source machine can determine which segments of data have been lost or not yet received by the destination machine. The destination machine also advertises its "local" offer window size (i.e., a "remote" offer window size from the perspective of the source machine), which is the amount of data (in bytes) that the destination machine is able to accept from the source machine (and that the source machine can send) prior to receipt of (i.e., without having to wait for) any ACKs or SACKs back from the destination machine. Correspondingly, based on TCP protocols, a source machine is adapted to transmit segments of data to a destination machine up to the offer window size advertised by the destination machine. Further, the source machine is adapted to retransmit any segment(s) of data that have not been ACKed or SACKed by the destination machine. Other features and aspects of TCP protocols will be understood by those skilled in the art and will be explained in greater detail only as necessary to understand and appreciate the present invention. Such protocols are described in greater detail in a number of publicly-available RFCs, including RFCs 793, 2988, 1323, and 2018, which are incorporated herein by reference in their entirety.

The act of formatting and processing TCP communications at the segment level is generally handled by computer hardware and software at each end of a particular communication. Typically, software accessed by the central processing unit (CPU) of the sender and the receiver, respectively, manages the bulk of TCP processing in accordance with industry-accepted TCP protocols. However, as the demand for the transfer of greater amounts of information at faster speeds has increased and as available bandwidth for transferring data has increased, CPUs have been forced to devote more processing time and power to the handling of TCP tasks—at the expense of other processes the CPU could be handling. "TCP Offload Engines" or TOEs, as they are often called, have been developed to relieve CPUs of handling TCP communications and tasks. TOEs are typically implemented as network adapter cards or as components on a network adapter card, which free up CPUs in the same system to handle other computing and processing tasks, which, in turn, speeds up the entire network. In other words, TCP tasks are "off-loaded" from the CPU to the TOE to improve the efficiency and speed of the network that employees such TOEs.

Conventional TOEs use a combination of hardware and software to handle TCP tasks. For example, TOE network adapter cards have software and memory installed thereon for processing TCP tasks. TOE application specific integrated circuits (ASICs) are also used for improved performance; however, ASICs typically handle TCP tasks using firmware/software installed on the chip and by relying upon and making use of readily-available external memory. Using such firmware and external memory necessarily limits the number of connections that can be handled simultaneously and imposes processing speed limitations due to transfer rates between separate components. Using state machines designed into the ASIC and relying upon the limited memory capability that can be integrated directed into an ASIC improves speed, but raises a number of additional TCP task management hurdles and complications if a large number of simultaneous connections are going to be managed efficiently and with superior speed characteristics.

For these and many other reasons, there is a need for systems and methods for improving TCP processing capabilities and speed, whether implemented in a TOE or a CPU environment.

There is a need for systems and methods of improving the speed of TCP communications, without sacrificing the reliability provided by TCP.

There is a need for systems and methods that take advantage of state machine efficiency for handling TCP tasks but in a way that remains compliant and compatible with conventional TCP systems and protocols.

There is a need for systems and methods that enable state machine implemented on one or more computer chips to handle TCP communications on the order of 1000 s and 10,000 s simultaneous communications and at processing speed exceeding 10 GHz.

There is a need for a system using a hardware TOE device that is adapted to support the Selective ACK (SACK) option of TCP protocol so that a source machine is able to cut back or minimize unnecessary retransmission. In other words, a system in which the source machine only retransmits the missing segments and avoids or minimizes heavy network traffic.

There is a need for systems and methods of continuing transmission of TCP segments for a particular communication even while simultaneously retransmitting TCP segments for the same communication.

There is a need for systems and methods of retransmitting TCP segments using a TCP state machine with limited on-chip memory.

There is a need for a system for efficiently retransmitting one or more TCP segments in a fast retransmission arrangement when SACK tracking is not being used.

There is a need for a system for efficiently retransmitting one or more TCP segments in a fast retransmission arrangement when SACK tracking is enabled and when such retransmission includes TCP segments between a last ACKed segment and a SACK region or between two SACK regions.

There is a need for a system for efficiently retransmitting TCP segments after a retransmission time out (RTO) condition in which no ACKs are received back from the TCP receiver system after a predetermined window of time.

There is a need for a system having an improved TCP window calculator adapted for use in a high speed, low memory hardware TOE device.

For these and many other reasons, there is a general need for a system or method for the retransmission of a TCP segment to a TCP receiving system in a processor system for the management of TCP communications wherein the processing system manages an original TCP connection with a TCP receiving system, the original TCP connection having socket, transmission, and reception characteristics and wherein the method comprises the steps of determining that the TCP segment previously transmitted on the original TCP connection to the TCP receiving system needs to be retransmitted and further establishing a selective context duplicated connection with the TCP receiving system, the selective context duplicated connection distinct from but having similar socket and transmission characteristics as the original TCP connection. The method further provides for retransmitting the TCP segment to the TCP receiving system by using the selective context duplicated connection rather than the original TCP connection and subsequently maintaining the original TCP connection for on-going transmission of additional TCP segments to the TCP receiving system and for receipt of communications back from the TCP receiving system responsive to the TCP segment retransmitted on the selective context duplicated connection.

There is also a general need for a system or method for the retransmission of a TCP segment to a designated one of a plurality TCP receiving systems in a processing system for the management of TCP communications, wherein the processor system is in electronic communication with the plurality of TCP receiving systems and wherein the method comprises the steps of managing a plurality of original TCP connections with the plurality of TCP receiving systems, each original TCP connection having respective socket, transmission, and reception characteristics. The method also determines that the TCP segment previously transmitted to the designated one TCP receiving system on the original TCP connection with the designated one TCP receiving system needs to be retransmitted, in addition to establishing a selective context duplicated connection with the designated one TCP receiving system, the selective context duplicated connection distinct from but having similar socket and transmission characteristics as the original TCP connection with the designated one TCP receiving system. The TCP segment is retransmitted to the receiving TCP system using the selective context duplicated connection rather than the original TCP connection with the designated one TCP receiving system. Further the original TCP connection is maintained with the designated one TCP receiving system for on-going transmission of additional TCP segments to the designated one receiving TCP system and for receipt of communications back from the designated one receiving TCP system responsive to the TCP segment retransmitted on the selective context duplicated connection.

There is also a general need, in a TCP fast retransmit communication system having a TCP transmitter system in communication with a plurality of TCP receiving systems, for a system or method having a TCP transmitter system that comprises a plurality of available connections wherein the available connections include a plurality of original TCP connections and at least one connection available as a selective context duplicated connection. Additionally, a TCP state engine is configured to maintain the plurality of original TCP connections and to transmit TCP segments over the plurality of original TCP connections to each of the plurality of TCP receiving systems and to receive acknowledgements of received TCP segments back from each of the TCP receiving systems, each original TCP connection having respective socket, transmission, and reception characteristics, a TCP micro engine in electronic communication with the TCP state engine, the TCP micro engine configured to establish the selective context duplicated connection between the TCP state engine and a designated one TCP receiving system upon receipt of a retransmission assistance request by the TCP state engine. Further, wherein after determination by the TCP state engine that a particular TCP segment has not been acknowledged by the designated one TCP receiving system, the TCP state engine transmits the retransmission assistance request to the TCP micro engine to establish the selective context duplicated connection with the designated one TCP receiving system, the particular TCP segment being retransmitted to the designated one TCP receiving system on the selective context duplicated connection rather than on the original TCP connection with the designated one TCP receiving system, the selective context duplicated connection distinct from but having similar socket and transmission characteristics as the original TCP connection with the designated one TCP receiving system.

There is also a general need, in a processor system for managing TCP communications, the processor system managing an original TCP connection with a TCP receiving system, the original TCP connection having socket, transmission, and reception characteristics, for a system or method for the fast retransmission of one or more contiguous TCP segments preceding a SACK region of TCP segments comprising the steps of determining that the one or more contiguous TCP segments previously transmitted on the original connection to the TCP receiving system needs to be retransmitted and as a result establishing a selective context duplicated connection with the TCP receiving system, the selective context duplicated connection having similar socket and transmission characteristics as the original TCP connection. Further, the method comprises the steps of retransmitting the one or more contiguous TCP segments to the TCP receiving system using the selective context duplicated connection and maintaining the original TCP connection for on-going transmission of additional TCP segments to the TCP receiving system and for receipt of communications back from the TCP receiving system responsive to the one or more contiguous TCP segments retransmitted on the selective context duplicated connection.

There is also a general need, in a processor system for managing TCP communications, the processor system managing an original TCP connection with a TCP receiving system, the original TCP connection having socket, transmission, and reception characteristics, a system or method for the fast retransmission of one or more contiguous TCP segments comprising the steps of determining that the one or more contiguous TCP segments previously transmitted on the original TCP connection to the TCP receiving system need to be retransmitted, the one or more contiguous TCP segments located between first and second SACK regions of TCP segments and establishing a selective context duplicated connection with the TCP receiving system, the selective context duplicated connection having similar socket and transmission characteristics as the original TCP connection. The method further retransmits the one or more contiguous TCP segments to the TCP receiving system using the selective context duplicated connection and maintains the original TCP connection for on-going transmission of additional TCP segments to the TCP receiving system and for receipt of communications back from the TCP receiving system responsive to the one or more contiguous TCP segments retransmitted on the selective context duplicated connection.

There is also a general need for a processor system for managing TCP communications, the processor system managing an original TCP connection with a TCP receiving system, the original TCP connection having socket, transmission, and reception characteristics, that comprises a method for the fast retransmission of first and second groups of one or more contiguous TCP segments, comprising the steps of determining that the first and second groups of one or more contiguous TCP segments previously transmitted on the original TCP connection to the TCP receiving system need to be retransmitted, the first group of one or more contiguous TCP segments preceding a first SACK region of TCP segments, the second group of one or more contiguous TCP segments located between the first SACK region and a second SACK region of TCP segments; establishing a selective context duplicated connection with the TCP receiving system, the selective context duplicated connection having similar socket and transmission characteristics as the original TCP connection. The method further retransmits the first and second groups of one or more contiguous TCP segments to the TCP receiving system using the selective context duplicated connection; and maintaining the original TCP connection for on-going transmission of additional TCP segments to the TCP receiving system and for receipt of communications back from the TCP receiving system responsive to the first and second groups of one or more contiguous TCP segments retransmitted on the selective context duplicated connection.

There is also a general need, in a processor system for managing TCP communications, the processor system managing an original TCP connection with a TCP receiving system, the original TCP connection having socket, transmission, and reception characteristics, for a system or method for the fast retransmission of first and second groups of one or more contiguous TCP segments comprising the steps of determining that the first group of one or more contiguous TCP segments previously transmitted on the original TCP connection to the TCP receiving system need to be retransmitted, the first group preceding a first SACK region of TCP segments and establishing a first selective context duplicated connection with the TCP receiving system, the first selective context duplicated connection having similar socket and transmission characteristics as the original TCP connection. The method further retransmits the first group of one or more contiguous TCP segments to the TCP receiving system using the first selective context duplicated connection and determines that the second group of one or more contiguous TCP segments previously transmitted on the original TCP connection to the TCP receiving system need to be retransmitted, the second group located between the first SACK region and a second SACK region of TCP segments; establishing a second selective context duplicated connection with the TCP receiving system, the second selective context duplicated connection also having similar socket and transmission characteristics as the original TCP connection. Next, the method retransmits the second group of one or more contiguous TCP segments to the TCP receiving system using the second selective context duplicated connection and maintains the original TCP connection for on-going transmission of additional TCP segments to the TCP receiving system and for receipt of communications back from the TCP receiving system responsive to the first and second groups of one or more contiguous TCP segments retransmitted on the first and second selective context duplicated connections.

The present invention meets one or more of the above-referenced needs as described herein in greater detail.

SUMMARY OF THE PRESENT INVENTION

The present invention relates generally to computer communication systems and protocols, and, more particularly, to methods and systems for high speed TCP communications using improved TCP Offload Engine (TOE) techniques and configurations. Briefly described, aspects of the present invention include the following.

A first aspect of the present invention is directed to a method for the retransmission of a TCP segment to a TCP receiving system in a processor system for the management of TCP communications wherein the processing system manages an original TCP connection with a TCP receiving system, the original TCP connection having socket, transmission, and reception characteristics. The method comprises the steps of determining that the TCP segment previously transmitted on the original TCP connection to the TCP receiving system needs to be retransmitted and further establishing a selective context duplicated connection with the TCP receiving system, the selective context duplicated connection distinct from but having similar socket and transmission characteristics as the original TCP connection. The method further provides for retransmitting the TCP segment to the TCP receiving system by using the selective context duplicated connection rather than the original TCP connection and subsequently maintaining the original TCP connection for on-going transmission of additional TCP segments to the TCP receiving system and for receipt of communications back from the TCP receiving system responsive to the TCP segment retransmitted on the selective context duplicated connection.

In a feature of this first aspect of the invention the step of determining is responsive to a timeout condition without receipt of an acknowledgement (ACK) from the TCP receiving system for the TCP segment previously transmitted by the processor system. Further features of the present invention provide that no further TCP segments are transmitted by the processor system until an acknowledgment of the retransmitted TCP segment is received back from the TCP receiving system and the selective context duplicated connection is closed as soon as the TCP segment is retransmitted to the TCP receiving system. Additionally, the retransmission is a fast retransmission and the original TCP connection is maintained for receipt of an acknowledgement (ACK) back from the TCP receiving system responsive to the TCP segments retransmitted on the original TCP connection.

In additional features of the present aspect of the invention the step of determining is responsive to the receipt by the processor system of three duplicate acknowledgements (ACKs) from the TCP receiving system, wherein the TCP segment that needs to be retransmitted comprises the segment having a left edge sequence number corresponding to the sequence number of the three duplicate ACKs. Further, the reception characteristics of the selective context duplicated connection are disabled and the reception characteristics of the original TCP connection are not used to define the selective context duplicated connection. Also, the selective context duplicated connection does not receive any communications back from the TCP receiving system and the original TCP connection and the selective context duplicated connection are linked together by means of a TCP micro engine.

In a yet further feature of the present aspect the step of determining comprises identifying a time out condition associated with the original TCP connection, further, wherein the TCP segment that needs to be retransmitted comprises the segment having a left edge sequence number corresponding to the sequence number of ACK last received from the TCP receiving system. Also, a feature of the present invention further comprises the step of calculating a new RTO timer for the TCP segment that is retransmitted using the selective context duplicated connection and loading the value of the RTO timer to the original TCP connection. Further, the on-going transmission of additional TCP segments to the TCP receiving system using the original TCP connection occurs contemporaneously with the step of retransmitting the TCP segment to the TCP receiving system using the selective context duplicated connection and the processor system includes a TCP state machine and a TCP micro engine.

In another feature of the first aspect of the invention the step of establishing the selective context duplicated connection with the TCP receiving system is performed by the TCP micro engine after receipt of a retransmission assistance request from the TCP state engine, wherein the selective context duplicated connection is closed by the TCP micro engine as soon as the TCP segment is retransmitted to the TCP receiving system by the TCP state machine. Additionally, the selective context duplicated connection is closed as soon as the TCP segment is retransmitted to the TCP receiving system. When the selective context duplicated connection is closed, the socket and transmission characteristics of the selective context duplicated connection are reset and the selective context duplicated connection is made available to the processor system for retransmission use with another original TCP connection.

In yet further features of the present aspect of the invention the sequence number of the last received ACK of the original TCP connection is used to define the left edge sequence number of the TCP segment to be retransmitted and further comprised is a step of creating a data link list for the selective context duplicated connection with pointers pointing to data that needs to be retransmitted. Also, the data that needs to be retransmitted is included in the TCP segment that is retransmitted, wherein after determining that the TCP segment needs to be retransmitted, calculating a congestion window size for the original TCP connection and the selective context duplicated connection is unaffected by the congestion window size of the original TCP connection.

Another aspect of the present invention is directed to a method for the retransmission of a TCP segment to a designated one of a plurality TCP receiving systems in a processing system for the management of TCP communications, wherein the processor system is in electronic communication with the plurality of TCP receiving systems. The method comprises the steps of managing a plurality of original TCP connections with the plurality of TCP receiving systems, each original TCP connection having respective socket, transmission, and reception characteristics.

The method also determines that the TCP segment previously transmitted to the designated one TCP receiving system on the original TCP connection with the designated one TCP receiving system needs to be retransmitted, in addition to establishing a selective context duplicated connection with the designated one TCP receiving system, the selective context duplicated connection distinct from but having similar socket and transmission characteristics as the original TCP connection with the designated one TCP receiving system. The TCP segment is retransmitted to the receiving TCP system using the selective context duplicated connection rather than the original TCP connection with the designated one TCP receiving system. Further the original TCP connection is maintained with the designated one TCP receiving system for on-going transmission of additional TCP segments to the designated one receiving TCP system and for receipt of communications back from the designated one receiving TCP system responsive to the TCP segment retransmitted on the selective context duplicated connection.

In a feature of the present aspect of the invention the step of determining is responsive to a timeout condition without receipt of an acknowledgement (ACK) from the designated one of the TCP receiving systems for the TCP segment previously transmitted by the processor system. Also, no further TCP segments are transmitted to the designated one of the TCP receiving systems by the processor system until an acknowledgment of the retransmitted TCP segment is received back from the designated one of the TCP receiving systems and the selective context duplicated connection is closed as soon as the TCP segment is retransmitted to the designated one of the TCP receiving systems.

In yet further features of the present aspect of the invention the retransmission is a fast retransmission and the original TCP connection with the designated one TCP receiving system is maintained for receipt of an acknowledgment (ACK) back from the designated one TCP receiving system responsive to the TCP segment retransmitted on the original TCP connection. Additionally, the step of determining is responsive to receipt by the processor system of three duplicate acknowledgements (ACKs) from the designated one TCP receiving system, wherein the TCP segment that needs to be retransmitted comprises the segment having a left edge sequence number corresponding to the sequence number of the three duplicate ACKs.

In yet additional features of the present aspect of the invention the reception characteristics of the selective context duplicated connection are disabled and the reception characteristics of the selective context duplicated connection are not used to define the selective context duplicated connection. Further, the selective context duplicated connection does not receive any communications back from the designated one TCP receiving system, also the original TCP connection with the designated one TCP receiving system and the selective context duplicated connection are linked together by means of a TCP micro engine.

The step of determining comprises identifying a time out condition associated with the original TCP connection with the designated one TCP receiving system in addition to the TCP segment that needs to be retransmitted comprising the segment having a left edge sequence number corresponding to the sequence number of ACK last received from the designated one TCP receiving system. Further featured is the step of calculating a new RTO timer for the TCP segment that is retransmitted by the selective context duplicated connection and loading the value of the RTO timer to the original TCP connection with the designated one TCP receiving system. The on-going transmission of additional TCP segments to the designated one TCP receiving system using the original TCP connection with the designated one TCP receiving system occurs contemporaneously with the step of retransmitting the TCP segment to the designed one TCP receiving system using the selective context duplicated connection. Also, the processor system includes a TCP state machine and a TCP micro engine and the step of establishing the selective context duplicated connection with the designed one TCP receiving system is performed by the TCP micro engine after receipt of a retransmission assistance request from the TCP state engine.

In yet further features of the present aspect of the invention the selective context duplicated connection is closed by the TCP micro engine as soon as the TCP segment is retransmitted to the designated one TCP receiving system by the TCP state machine and the selective context duplicated connection is closed as soon as the TCP segment is retransmitted to the designated one TCP receiving system. Additionally, when the selective context duplicated connection is closed, the socket and transmission characteristics of the selective context duplicated connection are reset and the selective context duplicated connection is made available to the processor system for retransmission use with another original TCP connection. The sequence number of the last received ACK of the original TCP connection with the designated one TCP receiving system is used to define the left edge sequence number of the TCP segment to be retransmitted.

Another feature of the present aspect of the invention further comprises the step of creating a data link list for the selective context duplicated connection with pointers pointing to data that needs to be retransmitted, wherein the data that needs to be retransmitted is included in the TCP segment that is retransmitted. Also, the features further comprises after determining that the TCP segment needs to be retransmitted, calculating a congestion window size for the original TCP connection with the designated one TCP receiving system, the selective context duplicated connection is unaffected by the congestion window size of the original TCP connection with the designated one TCP receiving system.

In a TCP fast retransmit communication system having a TCP transmitter system in communication over an original TCP connection with a TCP receiving system, a further aspect of the present invention comprises a TCP transmitter system that comprises a TCP state engine that is configured to transmit TCP segments over the original TCP connection to the TCP receiving system and to receive acknowledgements of received TCP segments back from the TCP receiving system. The original TCP connection having socket, transmission, and reception characteristics and a TCP micro engine that is in electronic communication with the TCP state engine, the TCP micro engine being configured to establish a selective context duplicated connection between the TCP state engine and the TCP receiving system upon receipt of a retransmission assistance request by the TCP state engine. The selective context duplicated connection is distinct from, but has similar socket and transmission characteristics as the original TCP connection. Furthermore, wherein after a determination by the TCP state engine that a particular TCP segment has not been acknowledged by the TCP receiving system, the TCP state engine transmits the retransmission assistance request to the TCP micro engine to establish the selective context duplicated connection, the particular TCP segment being retransmitted to the TCP receiving system on the selective context duplicated connection rather than on the original TCP connection.

In a feature of this present aspect of the invention the original TCP connection is maintained by the TCP state engine for on-going transmission of additional TCP segments to the TCP receiving system and for receipt of an acknowledgment back from the TCP receiving system upon receipt of the particular TCP segment. Further features include additional TCP segments being transmitted to the TCP receiving system using the original TCP connection contemporaneously with the retransmission of the particular TCP segment to the TCP receiving system using the selective context duplicated connection and wherein the determination by the TCP state engine that the particular TCP segment has not been acknowledged by the TCP receiving system is based upon receipt by the TCP state engine of three duplicate acknowledgements (ACKs) from the TCP receiving system.

In further features the reception characteristics of the selective context duplicated connection are disabled by the TCP micro engine and the reception characteristics of the selective context duplicated connection are not used to define the selective context duplicated connection. Also, the selective context duplicated connection is a one-way connection that does not receive any acknowledgment communications back from the TCP receiving system and the original connection and the selective context duplicated connection are linked together by the TCP micro engine. Additionally, the TCP micro engine calculates a new RTO timer for the particular TCP segment that is retransmitted by the selective context duplicated connection and associates the value of the RTO timer with the original TCP connection. The selective context duplicated connection is closed by the TCP micro engine after the particular TCP segment is retransmitted to the TCP receiving system, and when the selective context duplicated connection is closed, the socket and transmission characteristics of the selective context duplicated connection are reset and the selective context duplicated connection is made available to the TCP transmitter system for retransmission use with another original connection.

In a TCP fast retransmit communication system having a TCP transmitter system in communication with a plurality of TCP receiving systems, an additional aspect of the present invention comprises a TCP transmitter system that comprises a plurality of available connections. The available connections include a plurality of original TCP connections and at least one connection available as a selective context duplicated connection. Additionally, a TCP state engine is configured to maintain the plurality of original TCP connections and to transmit TCP segments over the plurality of original TCP connections to each of the plurality of TCP receiving systems and to receive acknowledgements of received TCP segments back from each of the TCP receiving systems, each original TCP connection having respective socket, transmission, and reception characteristics, a TCP micro engine in electronic communication with the TCP state engine, the TCP micro engine configured to establish the selective context duplicated connection between the TCP state engine and a designated one TCP receiving system upon receipt of a retransmission assistance request by the TCP state engine. Further, wherein after determination by the TCP state engine that a particular TCP segment has not been acknowledged by the designated one TCP receiving system, the TCP state engine transmits the retransmission assistance request to the TCP micro engine to establish the selective context duplicated connection with the designated one TCP receiving system, the particular TCP segment being retransmitted to the designated one TCP receiving system on the selective context duplicated connection rather than on the original TCP connection with the designated one TCP receiving system, the selective context duplicated connection distinct from but having similar socket and transmission characteristics as the original TCP connection with the designated one TCP receiving system.

In a feature of the present aspect of the invention the original TCP connection with the designated one TCP receiving system is maintained by the TCP state engine for on-going transmission of additional TCP segments to the designated one TCP receiving system and for receipt of an acknowledgment back from the designated one TCP receiving system upon receipt of the particular TCP segment. Further, additional TCP segments are transmitted to the designated one TCP receiving system using the original TCP connection with the designated one TCP receiving system contemporaneously with the retransmission of the particular TCP segment to the designated one TCP receiving system using the selective context duplicated connection. The determination by the TCP state engine that the particular TCP segment has not been acknowledged by the designated one TCP receiving system is based upon receipt by the TCP state engine of three duplicate acknowledgements (ACKs) from the designated one TCP receiving system.

Additional features of the present aspect provide for the reception characteristics of the selective context duplicated connection are disabled by the TCP micro engine and the reception characteristics of the selective context duplicated connection are not used to define the selective context duplicated connection. Also, the selective context duplicated connection is a one-way connection that does not receive any acknowledgment communications back from any of the TCP receiving systems and the original connection and the selective context duplicated connection with the designated one TCP receiving system are linked together by the TCP micro engine.

The TCP micro engine calculates a new RTO timer for the particular TCP segment that is retransmitted by the selective context duplicated connection and associates the value of the RTO timer with the original TCP connection with the designated one TCP receiving system and additionally the selective context duplicated connection is closed by the TCP micro engine after the particular TCP segment is retransmitted to the designated one TCP receiving system. When the selective context duplicated connection is closed, the socket and transmission characteristics of the selective context duplicated connection are reset and the selective context duplicated connection is made available to the TCP transmitter system for retransmission use with another original connection.

In a processor system for managing TCP communications, the processor system managing an original TCP connection with a TCP receiving system, the original TCP connection having socket, transmission, and reception characteristics, a yet another aspect of the present invention comprise a method for the fast retransmission of one or more contiguous TCP segments preceding a SACK region of TCP segments. The method comprises the steps of determining that the one or more contiguous TCP segments previously transmitted on the original connection to the TCP receiving system needs to be retransmitted and as a result establishing a selective context duplicated connection with the TCP receiving system, the selective context duplicated connection having similar socket and transmission characteristics as the original TCP connection. Further, the method comprises the steps of retransmitting the one or more contiguous TCP segments to the TCP receiving system using the selective context duplicated connection and maintaining the original TCP connection for on-going transmission of additional TCP segments to the TCP receiving system and for receipt of communications back from the TCP receiving system responsive to the one or more contiguous TCP segments retransmitted on the selective context duplicated connection.

In a feature of the present aspect of the invention the step of determining is responsive to receipt by the processor system of a selective acknowledgment (SACK) from the TCP receiving system, the SACK identifying the one or more contiguous TCP segments not yet received by the TCP receiving system that lie between a last acknowledged TCP segment and the SACK region. Also, the one or more contiguous TCP segments comprise a single TCP segment and the one or more contiguous TCP segments comprise a plurality of TCP segments.

In additional features of the present aspect the one or more contiguous TCP segments are defined between a left edge sequence number corresponding to the sequence number of the last acknowledged TCP segment and a right edge sequence number corresponding to the sequence number just prior to the SACK region. Further, the reception characteristics of the selective context duplicated connection are disabled and the reception characteristics of the original TCP connection are not used to define the selective context duplicated connection. Also, the original TCP connection and the selective context duplicated connection are linked together by means of a TCP micro engine.

Yet further features of the present inventive aspect comprise the step of calculating a new RTO timer for the one or more contiguous TCP segments that are retransmitted using the selective context duplicated connection and assigning the value of the RTO timer to the original TCP connection, wherein the on-going transmission of additional TCP segments to the receiving TCP system using the original TCP connection occurs contemporaneously with the step of retransmitting the one or more contiguous TCP segments to the TCP receiving system using the selective context duplicated connection. Also, the processor system includes a TCP state machine and a TCP micro engine and the step of establishing the selective context duplicated connection with the TCP receiving system is performed by the TCP micro engine after receipt of a retransmission assistance request from the TCP state engine.

In yet additional features of the present inventive aspect the selective context duplicated connection is closed by the TCP micro engine after the one or more contiguous TCP segments are retransmitted to the TCP receiving system by the TCP state machine and the selective context duplicated connection is closed as soon as the one or more contiguous TCP segments are retransmitted to the TCP receiving system. Further, the socket and transmission characteristics of the selective context duplicated connection are reset and the selective context duplicated connection is made available to the processor system for retransmission use with another original TCP connection.

A yet further feature of the present inventive aspect comprises the step of creating a data link list for the selective context duplicated connection with pointers pointing to data that needs to be retransmitted, wherein the data that needs to be retransmitted is included in the one or more contiguous TCP segments that are retransmitted. Also, the aspect further comprises the feature of after determining that the one or more contiguous TCP segments need to be retransmitted, calculating a congestion window size for the original TCP connection and the selective context duplicated connection is unaffected by the congestion window size of the original TCP connection.

In a processor system for managing TCP communications, the processor system managing an original TCP connection with a TCP receiving system, the original TCP connection having socket, transmission, and reception characteristics, a yet further aspect of the present invention comprises a method for the fast retransmission of one or more contiguous TCP segments. The method comprises the steps of determining that the one or more contiguous TCP segments previously transmitted on the original TCP connection to the TCP receiving system need to be retransmitted, the one or more contiguous TCP segments located between first and second SACK regions of TCP segments and establishing a selective context duplicated connection with the TCP receiving system, the selective context duplicated connection having similar socket and transmission characteristics as the original TCP connection. The method further retransmits the one or more contiguous TCP segments to the TCP receiving system using the selective context duplicated connection and maintains the original TCP connection for on-going transmission of additional TCP segments to the TCP receiving system and for receipt of communications back from the TCP receiving system responsive to the one or more contiguous TCP segments retransmitted on the selective context duplicated connection.

In a feature of this present aspect of the invention the step of determining is responsive to receipt by the processor system of two selective acknowledgments (SACKs) from the TCP receiving system, the two SACKs identifying the first and second SACK regions, respectively, and wherein the one or more contiguous TCP segments that need to be retransmitted are between the first and second SACK regions. Further, the one or more contiguous TCP segments have a left edge sequence number corresponding to the last sequence number of the first SACK region and a right edge sequence number corresponding to the sequence number just prior to the second SACK region. Also, the one or more contiguous TCP segments comprises a single TCP segment and the one or more contiguous TCP segments comprises a plurality of TCP segments. Additionally, the reception characteristics of the selective context duplicated connection are disabled and the reception characteristics of the original TCP connection are not used to define the selective context duplicated connection in addition to the original TCP connection and the selective context duplicated connection are linked together through a TCP micro engine.

A further feature of the present inventive aspect comprises the step of calculating a new RTO timer for the one or more contiguous TCP segments that are retransmitted by the selective context duplicated connection and loading the value of the RTO timer to the original TCP connection. Further, the on-going transmission of additional TCP segments to the TCP receiving system using the original TCP connection occurs contemporaneously with the step of retransmitting the one or more contiguous TCP segments to the TCP receiving system using the selective context duplicated connection. Also, the processor system includes a TCP state machine and a TCP micro engine and the step of establishing the selective context duplicated connection with the TCP receiving system is performed by the TCP micro engine after receipt of a retransmission assistance request from the TCP state engine.

In yet additional features of the present inventive aspect the selective context duplicated connection is closed by the TCP micro engine as soon as the one or more contiguous TCP segments are retransmitted to the TCP receiving system by the TCP state machine. Additionally, the selective context duplicated connection is closed as soon as the one or more contiguous TCP segments are retransmitted to the TCP receiving system and the socket and transmission characteristics of the selective context duplicated connection are reset and the selective context duplicated connection is made available to the processor system for retransmission use with another original connection.

The aspect also features the step of creating a data link list for the selective context duplicated connection with pointers pointing to data that needs to be retransmitted, wherein the data that needs to be retransmitted is included in the one or more contiguous TCP segments that are retransmitted. The aspect further features the step of after determining that the one or more contiguous TCP segments need to be retransmitted, calculating a congestion window size for the original TCP connection, wherein the selective context duplicated connection is unaffected by the congestion window size of the original TCP connection.

In a processor system for managing TCP communications, the processor system managing an original TCP connection with a TCP receiving system, the original TCP connection having socket, transmission, and reception characteristics, a yet additional aspect of the present invention comprises a method for the fast retransmission of first and second groups of one or more contiguous TCP segments, comprising the steps of determining that the first and second groups of one or more contiguous TCP segments previously transmitted on the original TCP connection to the TCP receiving system need to be retransmitted, the first group of one or more contiguous TCP segments preceding a first SACK region of TCP segments, the second group of one or more contiguous TCP segments located between the first SACK region and a second SACK region of TCP segments; establishing a selective context duplicated connection with the TCP receiving system, the selective context duplicated connection having similar socket and transmission characteristics as the original TCP connection. The method further retransmits the first and second groups of one or more contiguous TCP segments to the TCP receiving system using the selective context duplicated connection; and maintaining the original TCP connection for on-going transmission of additional TCP segments to the TCP receiving system and for receipt of communications back from the TCP receiving system responsive to the first and second groups of one or more contiguous TCP segments retransmitted on the selective context duplicated connection.

A feature of this present aspect of the invention comprises the step of determining that the first group of one or more contiguous TCP segments previously transmitted on the original TCP connection to the TCP receiving system need to be retransmitted is responsive to receipt by the processor system of a selective acknowledgment (SACK) from the TCP receiving system, the SACK identifying the first group of one or more contiguous TCP segments not yet received by the TCP receiving system that lie between a last acknowledged TCP segment and the first SACK region. Further features include the first group of one or more contiguous TCP segments comprising a single TCP segment and the first group of one or more contiguous TCP segments comprising a plurality of TCP segments. Additionally, the first group of one or more contiguous TCP segments are defined between a left edge sequence number corresponding to the sequence number of the last acknowledged TCP segment and a right edge sequence number corresponding to the sequence number just prior to the first SACK region.

Further featured is the step of determining that the second group of one or more contiguous TCP segments previously transmitted on the original TCP connection to the TCP receiving system need to be retransmitted is responsive to receipt by the processor system of two selective acknowledgments (SACKs) from the TCP receiving system, the two SACKs identifying the first and second SACK regions, respectively. Also, the second group of one or more contiguous TCP segments have a left edge sequence number corresponding to the last sequence number of the first SACK region and a right edge sequence number corresponding to the sequence number just prior to the second SACK region and the second group of one or more contiguous TCP segments comprises a single TCP segment, wherein the second group of one or more contiguous TCP segments comprises a plurality of TCP segments.

In a processor system for managing TCP communications, the processor system managing an original TCP connection with a TCP receiving system, the original TCP connection having socket, transmission, and reception characteristics, a yet another additional aspect of the present invention comprises a method for the fast retransmission of first and second groups of one or more contiguous TCP segments. The method comprises the steps of determining that the first group of one or more contiguous TCP segments previously transmitted on the original TCP connection to the TCP receiving system need to be retransmitted, the first group preceding a first SACK region of TCP segments and establishing a first selective context duplicated connection with the TCP receiving system, the first selective context duplicated connection having similar socket and transmission characteristics as the original TCP connection. The method further retransmits the first group of one or more contiguous TCP segments to the TCP receiving system using the first selective context duplicated connection and determines that the second group of one or more contiguous TCP segments previously transmitted on the original TCP connection to the TCP receiving system need to be retransmitted, the second group located between the first SACK region and a second SACK region of TCP segments; establishing a second selective context duplicated connection with the TCP receiving system, the second selective context duplicated connection also having similar socket and transmission characteristics as the original TCP connection. Next, the method retransmits the second group of one or more contiguous TCP segments to the TCP receiving system using the second selective context duplicated connection and maintains the original TCP connection for on-going transmission of additional TCP segments to the TCP receiving system and for receipt of communications back from the TCP receiving system responsive to the first and second groups of one or more contiguous TCP segments retransmitted on the first and second selective context duplicated connections.

A feature of this present aspect of the invention comprises a step of determining that the first group of one or more contiguous TCP segments previously transmitted on the original TCP connection to the TCP receiving system need to be retransmitted is responsive to receipt by the processor system of a selective acknowledgment (SACK) from the TCP receiving system, the SACK identifying the first group of one or more contiguous TCP segments not yet received by the TCP receiving system that lie between a last acknowledged TCP segment and the first SACK region. Further features of this inventive aspect include the first group of one or more contiguous TCP segments comprising a single TCP segment, wherein the first group of one or more contiguous TCP segments comprise a plurality of TCP segments. Also, the first group of one or more contiguous TCP segments are defined between a left edge sequence number corresponding to the sequence number of the last acknowledged TCP segment and a right edge sequence number corresponding to the sequence number just prior to the first SACK region.

A yet further feature comprises the step of determining that the second group of one or more contiguous TCP segments previously transmitted on the original TCP connection to the TCP receiving system need to be retransmitted is responsive to receipt by the processor system of two selective acknowledgments (SACKs) from the TCP receiving system, the two SACKs identifying the first and second SACK regions, respectively. Also featured in the aspect is the second group of one or more contiguous TCP segments have a left edge sequence number corresponding to the last sequence number of the first SACK region and a right edge sequence number corresponding to the sequence number just prior to the second SACK region.

In yet additional features of the present inventive aspect the second group of one or more contiguous TCP segments comprises a single TCP segment, wherein the second group of one or more contiguous TCP segments comprises a plurality of TCP segments. Also, the reception characteristics of the first and second selective context duplicated connections are disabled and the reception characteristics of the original TCP connection are not used to define the first and second selective context duplicated connections. Further, the first and second selective context duplicated connections do not receive any communications back from the TCP receiving system and the original TCP connection and the first and second selective context duplicated connections are linked together by means of a TCP micro engine. Also featured is the step of determining that the first or second group of one or more contiguous TCP segments previously transmitted on the original TCP comection to the TCP receiving system need to be retransmitted comprises identifying a time out condition associated with the original TCP connection.

The on-going transmission of additional TCP segments to the receiving TCP system using the original TCP connection occurs contemporaneously with the step of retransmitting the first or second group of one or more contiguous TCP segments to the TCP receiving system using the first or second selective context duplicated connections, respectively, wherein the processor system includes a TCP state machine and a TCP micro engine. Also, the step of establishing the first and second selective context duplicated connections with the TCP receiving system is performed by the TCP micro engine after receipt of retransmission assistance requests from the TCP state engine, wherein the first selective context duplicated connection is closed as soon as the first group of one or more contiguous TCP segments are retransmitted to the TCP receiving system. Further, the socket and transmission characteristics of the first selective context duplicated connection are reset and the first selective context duplicated connection is made available to the processor system for retransmission use with another original TCP connection. Additionally, the second selective context duplicated connection is closed as soon as the second group of one or more contiguous TCP segments are retransmitted to the TCP receiving system and the socket and transmission characteristics of the second selective context duplicated connection are reset and the second selective context duplicated connection is made available to the processor system for retransmission use with another original TCP connection.

The present invention also encompasses computer-readable medium having computer-executable instructions for performing methods of the present invention, and computer networks, state machines, and other hardware and software systems that implement the methods of the present invention.

The above features as well as additional features and aspects of the present invention are disclosed herein and will become apparent from the following description of preferred embodiments of the present invention.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein:

FIG. 10 illustrates a table of parameters copied from an original connection to an SCD connection of the present invention;

FIG. 11 illustrates a table of the connection status bit formats of the present invention;

FIG. 12B is another retransmission condition diagram using an SCD connection of the present invention;

FIG. 17 is a table of the input parameter protocols for TCP window calculator of FIG. 14;

FIG. 18 is a table of the outputs for two clock cycles for the TCP window calculator of FIG. 14;

FIG. 19 is a table of the outputs for three clock cycles for the TCP window calculator of FIG. 14;

FIG. 20 is a table of the outputs for five clock cycles for the TCP window calculator of FIG. 14;

DETAILED DESCRIPTION OF PREFERRED EMBODIMENTS

In conventional TCP software systems accessed by a CPU or in a conventional TOE device, it is relatively easy to manage the transmission, retransmission, and fast retransmission of lost, delayed, or mis-communicated segments. For example, it generally costs several hundred clock cycles to retransmit TCP segments along an original TCP connection. In other words, a conventional TCP system is only capable of running at a processing speed of approximately 1 gigabit (Gbit) per segment when required to retransmit lost, delayed, or previously mis-communicated TCP segments. There is also no significant degradation of performance, at this slow processing speed, when using the same or original TCP connection to handle original transmissions and any necessary retransmissions.

Figure 1A:
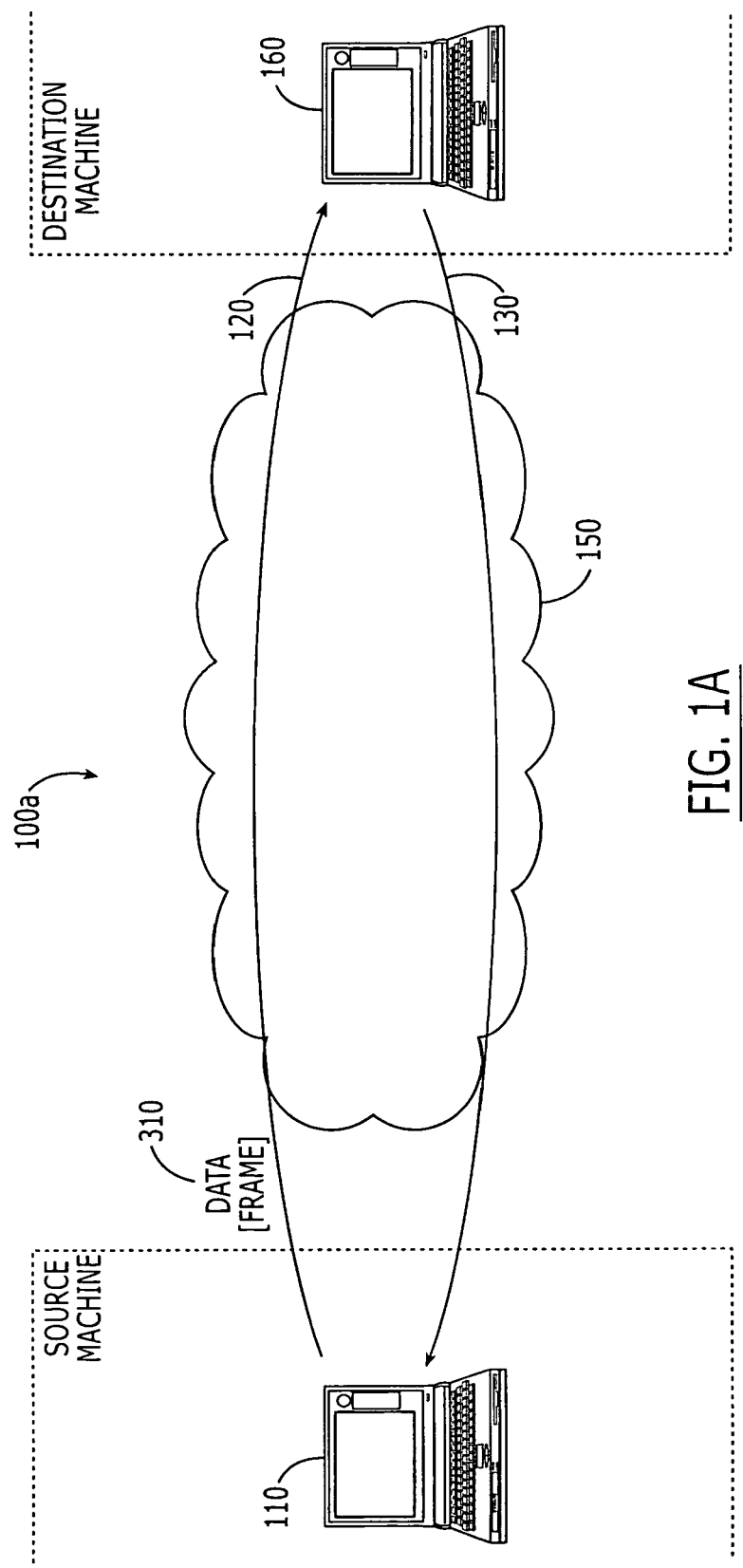
FIG. 1A is a system view of a conventional TCP/IP communication system in which the present invention operates.
Figure 1B:
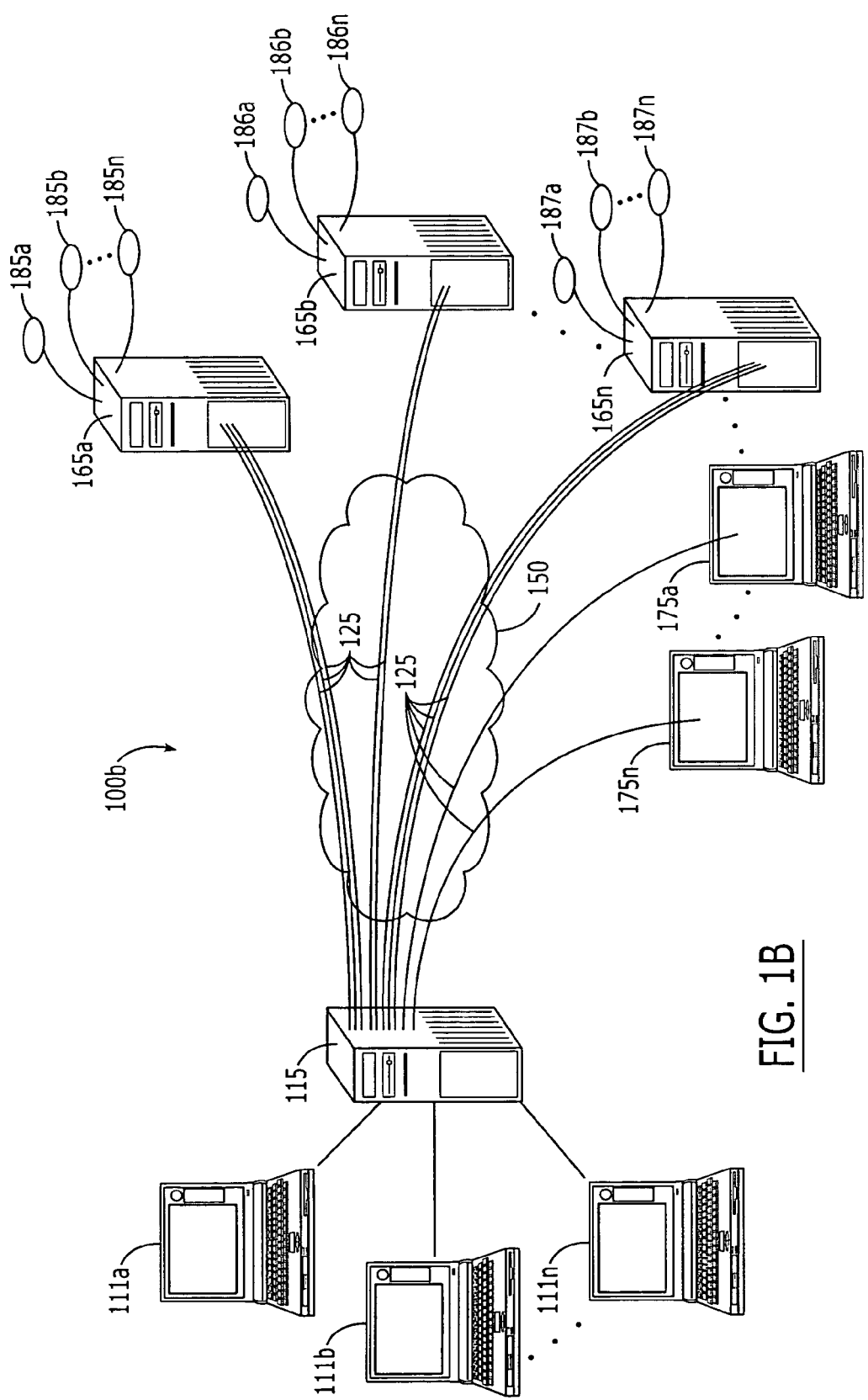
FIG. 1B is a system view of another conventional TCP/IP communication system in which the present invention operates.
Figure 2:
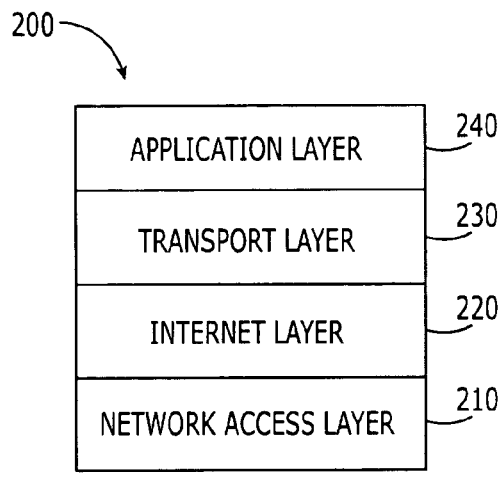
FIG. 2 illustrates conventional TCP/IP layers in which the present invention operates.
Figure 3:
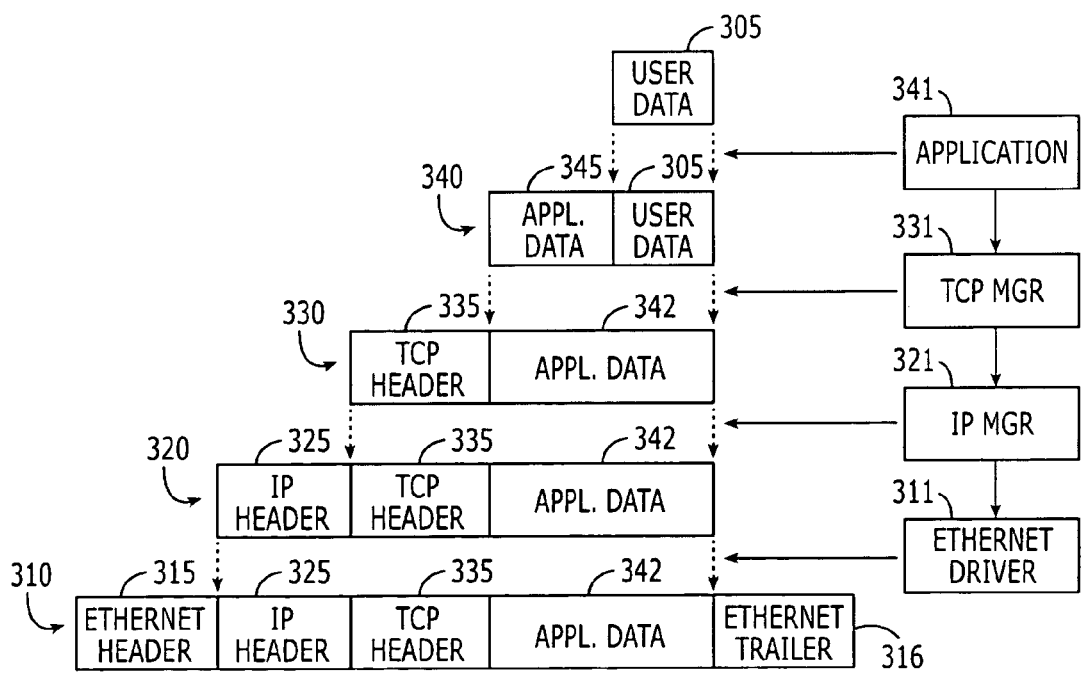
FIG. 3 illustrates a conventional TCP/IP system for packaging and unpackaging data in a TCP/IP system of the present invention.
Figure 4A:
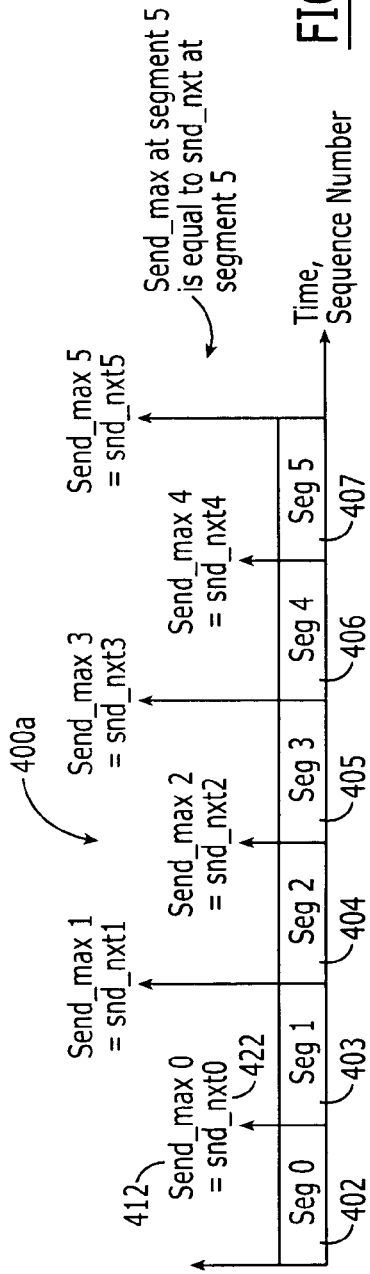
FIG. 4A is a timeline illustrating a conventional TCP transmission sequence.
Figure 4B:
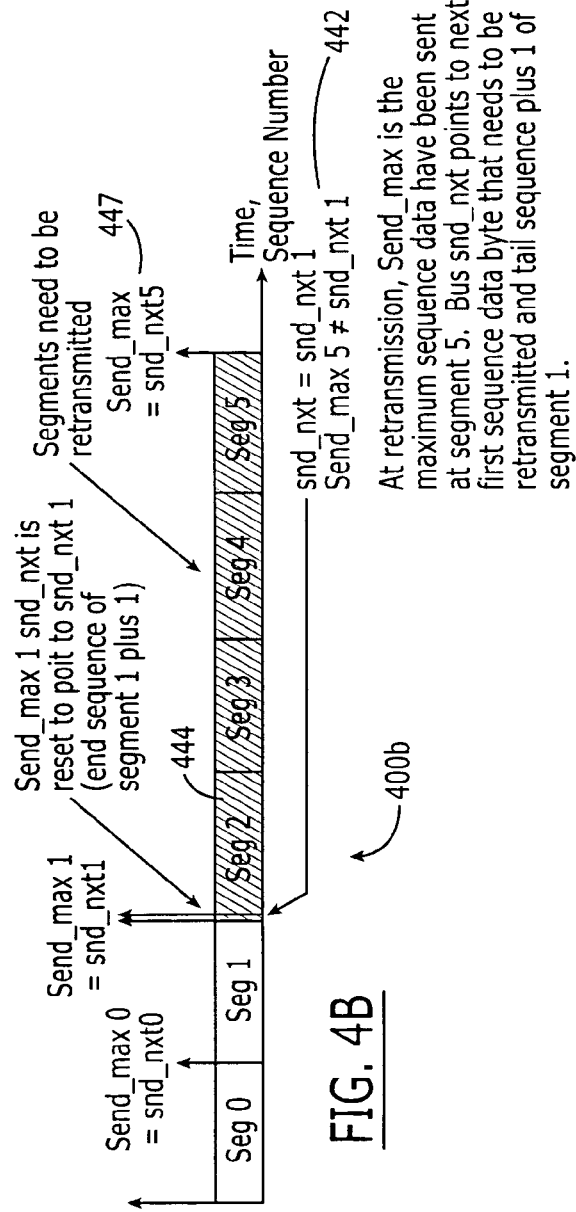
FIG. 4B is a timeline illustrating a conventional TCP retransmission sequence.

Some aspects of transmitting and retransmitting segments in a conventional TCP system are illustrated, for comparison purposes, in FIGS. 4A and 4B. Turning first to FIG. 4A, timeline 400a illustrates a normal TCP transmission in which the source machine sends segments 0 through 5 (Seg 0 . . . . Seg 5) in sequence, as designated by blocks 402, 403, 404, 405, 406, and 407. Upon the sending of each respective segment, variables (snd_max and send_nxt) maintained by the source machine are updated. For example, when segment 0 is sent, the snd_max variable 412 (designated as snd_max0 since segment 0 has already been sent) is updated to have a value equal to the first sequence number of the next segment (i.e., segment 1) that needs to be transmitted. The send_nxt variable 422 (also designated as send_nxt0 since segment 0 has been sent) is updated to the same value since segment 1 is the segment that needs to be sent next. This process proceeds for each successful segment transmitted. As long as the transmitted segments are received properly and acknowledged (ACKed) by the TCP receiver system (destination machine), the snd_max and send_nxt of the source machine for this transmission remain in sync and at the same value. However, suppose that after sending segment 5, designated by block 407, the source machine receives three identical ACKs of the first sequence number of segment 2, which corresponds to the snd_una variable of segment 1 (maintained by the destination machine for this transmission). When this occurs, the source machine causes this particular TCP connection to go into a "fast retransmit" mode, in conventional manner. As shown on the timeline 400b of FIG. 4B, "fast retransmit" mode causes the send_nxt variable 442 for this TCP connection to point back (temporarily) to the value it had at send_nxtl. The snd_max value remains at snd_max5 447. This means that the "normal" TCP transmission is temporarily stopped because the send_nxt pointer has to move. Segment 2, designated by block 444, is then retransmitted along the same TCP connection. Then the source machine resets the send_nxt variable for this TCP connection back to the value it had when it entered "fast retransmit" mode, which in this example is send_nxt5. This TCP connection then resumes sending the next in-order segment (i.e., segment 6) in conventional manner.

In-order to handle connections on the order of 1000 s and 10,000 s using a single TOE device and in order to achieve processing speeds exceeding 10 GHz, however, it is preferable to streamline the bulk of the TCP processing to a TOE device comprising a TCP state machine having access to a limited amount of memory capacity on the same integrated circuit. When this is done, it is not feasible to use both the send_nxt and snd_max variables for every connection handled by the TOE device. The reason for this is because each send_nxt parameter takes up 4 bytes of memory per connection. Thus, if the TOE device is expected to manage 1000+ connections simultaneously, this uses up 4 kbytes of limited memory just to store this one parameter, which, as was explained with reference to FIGS. 4A and 4B, is in most circumstances redundant with the snd_max variable.

For systems, such as the present invention, which are designed to accommodate a large number of high-speed connections in a limited memory environment, successful management of the large number of high speed TCP connections becomes problematic. The present invention solves this problem in two ways. First, instead of allowing all available TCP connections to be used for retransmission purposes, only a specified, limited number of the total available connections of the TOE device are dedicated to retransmission tasks. Such retransmission connections, which will be called selective context duplication (SCD) or "clone" connections hereinafter, are made available to work in conjunction with any one of the original or primary TCP connections for retransmission purposes on a rolling basis. This is a viable solution because in typical TCP communications, less than 10% of all TCP communications are needed for retransmission traffic. Thus, in the present invention, between 16 and 32 per each 1024 connections may be allocated for retransmission tasks only. Second, the present invention does not use the send_nxt variable. Instead, the present invention introduces a new variable or parameter, appl_init_seq, which is usable not only by the original or primary TCP connections but also by the SCD or clone connections. This new variable not only allows each TCP connection to build segments for normal transmission more quickly, but also provides the necessary parameter for building retransmission segments, while only using 1.22 kbytes of memory capacity. Details of SCD connections and the appl_init_seq parameter will be discussed in greater detail hereinafter.

Figure 5:
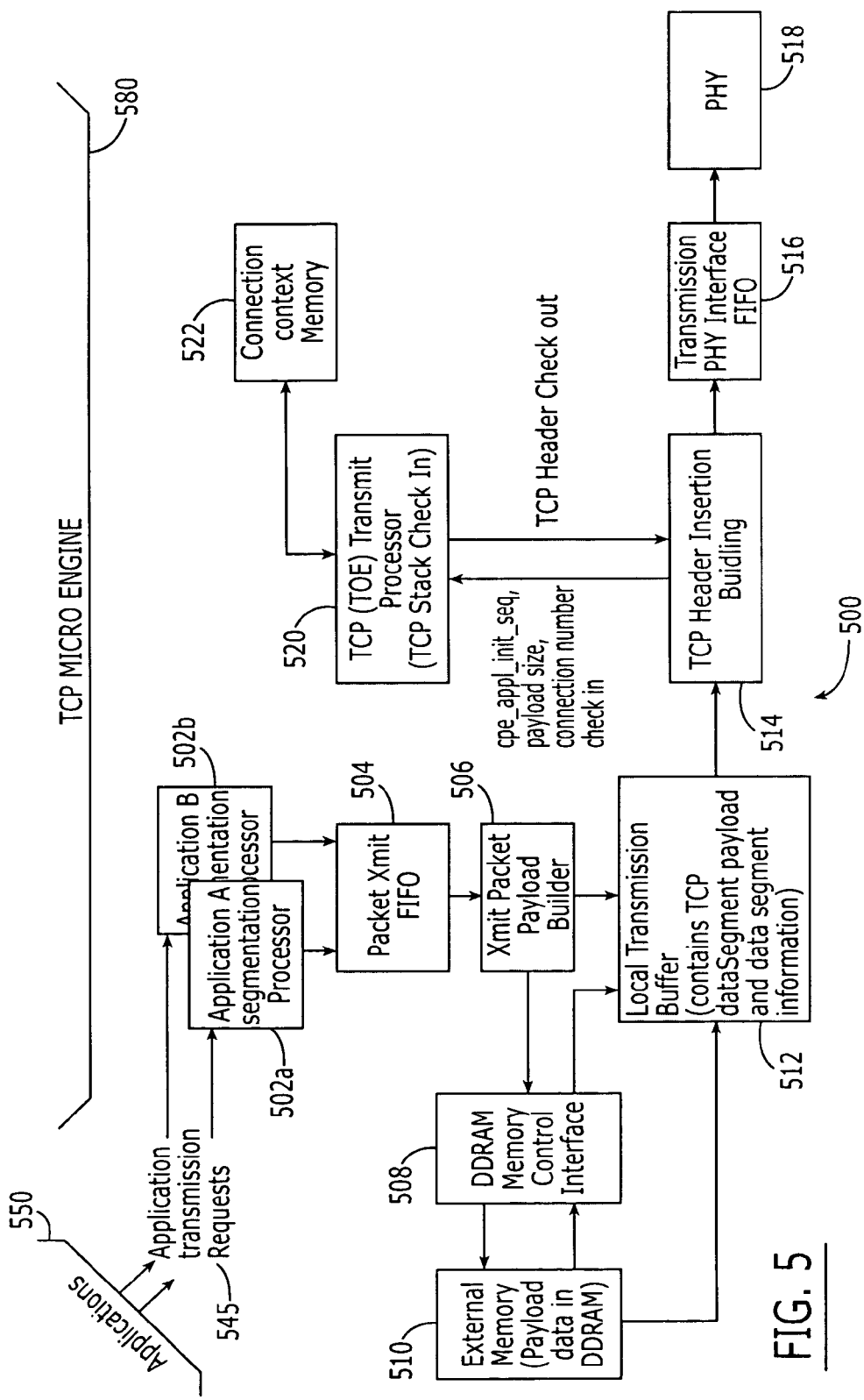
FIG. 5 is a simplified block diagram of the primary components on the transmit side of a high speed TCP processor system of the present invention.

Turning first to FIG. 5, a simplified block diagram showing the primary components on the transmit side of a high-speed TCP processor system 500 of the present invention are illustrated. The TCP processor system 500 includes a TCP state engine that interacts and interfaces with software applications 550 of the source machine and with at least one TOE micro engine 580. The TCP processor system 500 includes application segmentation processors 502, a packet FIFO buffer 504, a transmit packet payload builder 506, a memory control interface 508, external memory 510, a local transmit buffer 512, a TCP header insertion building component 514, a TCP transmit processor 520, connection context memory 522, a transmission physical layer FIFO interface 516, and a physical layer or PHY component 518.

When an application 550 needs to send data to a destination machine, application transmission requests 545 are sent to a respective application segmentation processor 502, which determines how the relevant data will be divided into appropriate segment size chunks of information. This determination information and relevant pointers are loaded into packet transmit FIFO 504, which forwards the same to the transmit packet payload builder 506. The transmit packet payload builder 506 cooperates with the memory control interface 508 to extract the actual application data from memory 510, which is forwarded to the local transmission buffer 512, which contains TCP segment payload and data segment information. The TCP header insertion building component 514 takes this information from the local transmission buffer 512 and "checks it in" with the TOE transmit processor 520. TCP header insertion building component 514 passes the appl_init_seq parameter, payload size, and connection number to the TOE transmit processor 520. The TOE transmit processor 520 extracts other necessary variables and parameters from the connection context memory 522 and then "checks out" the segment back to the TCP header insertion building component 514. The TCP header insertion building component 514 then forwards the segment to the transmission PHY interface 516, where it is forward on to the remaining layers of the TCP/IP stack for addition of IP and Ethernet headers and tails prior to transmission in conventional manner.

Figure 6:
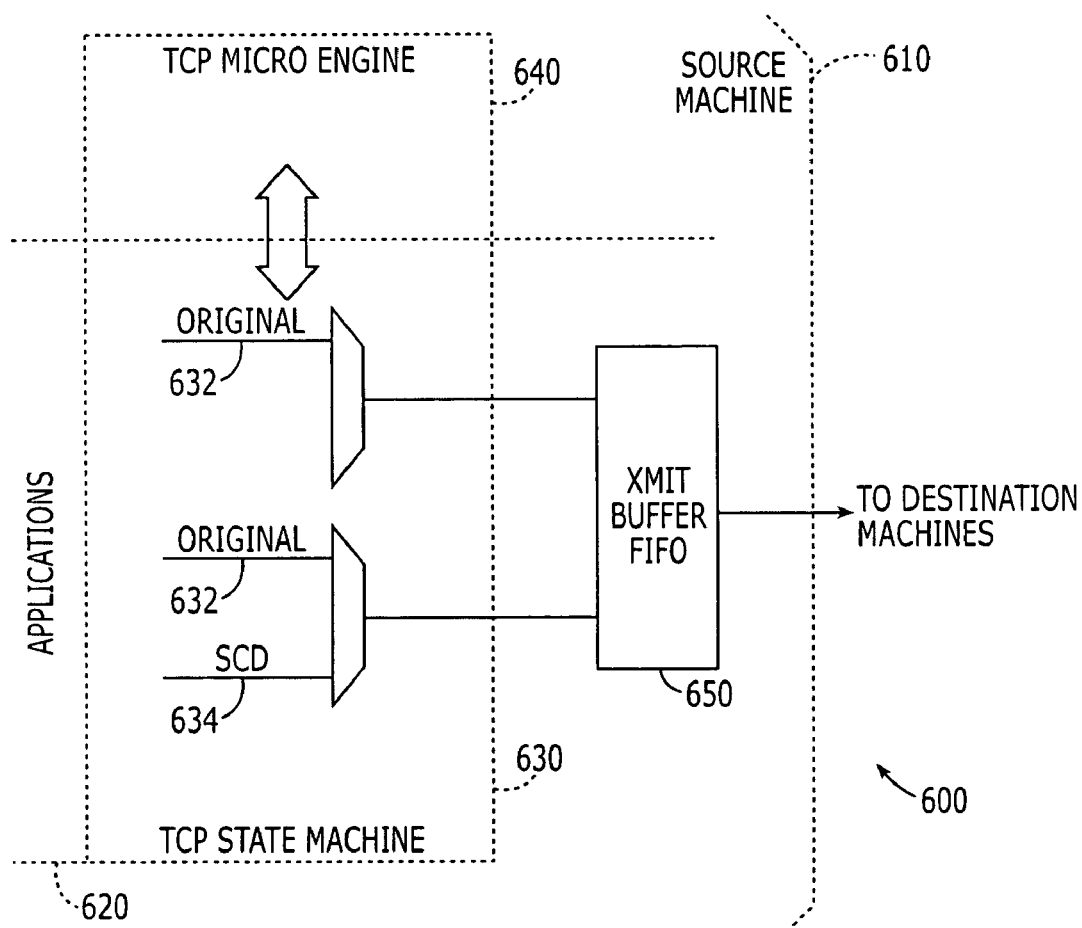
FIG. 6 is a simplified block diagram of an SCD connection of the present invention.

Turning now to FIG. 6, a simplified block diagram 600 illustrates the process of creating and using an SCD connection to advantage. In a source machine 610 managing a large plurality of TCP connections, software applications 620 interface with the TCP processor system of the present invention. The TCP processor system includes a TCP state machine 630 and one or more TCP micro engines 640. Each primary TCP connection has an original, dedicated connection 632. The connection parameters or characteristics (socket, addressing, reception, etc.) for each original TCP connection is managed by the one or more TCP micro engines 640. Data for each original TCP connection hits a transmit buffer 650 that assists in the ordering and packaging of each data packet at the IP and Ethernet layers of the TCP/IP stack prior to actual transmission. Whenever a retransmission situation occurs with any original TCP connection, the TCP micro engine 640 is responsible for creating an SCD connection 634 associated with the original TCP connection that is in retransmit mode. As stated previously, if a particular TCP state machine 630 is handling on the order of 1000 simultaneous TCP connections, between 16 and 32 SCD connections are available on a rolling basis to the TCP processor system for use in association with any of the original TCP connections 632 that need retransmission assistance.

It should be understood that each SCD connection 634 is set up and established as a transmission-side-only TCP connection. Preferably, it contains only a transmission side configuration without the receive side configuration or with the receive side configuration disabled. It has all the same parameters from IP layer three down. However, the TCP layer for the SCD connection 634 does not contain any TCP timers or any round trip timing capability.

When the TCP state engine 630 detects a fast retransmit condition for a particular original TCP connection (i.e., by receiving three or more consecutive duplicate ACKs from the TCP receiver system), the TCP state engine 630 generates a message or request to the TCP micro engine 640 for retransmission assistance.

The TCP micro engine 640 then builds an SCD connection associated or linked with the original TCP connection that asked for retransmission assistance. The SCD connection 634 has similar socket and transmission characteristics as the original TCP connection 632 with which it is associated with a few minor differences. The SCD connection 634 and its associated original TCP connection 632 are worked side by side as a single "connection set." This is accomplished by the TCP micro engine 640, which links the original TCP connection 632 and SCD connection 634 together through messages. The SCD connection 634 is used for retransmission only—its receive side is disable. On the other hand, the original TCP connection 632 is used for both transmission and reception processing.

The TCP micro engine 640 performs the following tasks for fast retransmission: (i) it sets up the SCD connection 634 by copying most of the parameters or characteristics from the original TCP connection 632. But the receive side of the SCD connection 634 is disable so that all acknowledgments (ACKs) back from the TCP receiver system of the destination machine are received by the original TCP connection 632 as normal. Hardware within the TCP state machine 630 also uses a one bit variable to indicate that this particular TCP connection is being used only as an SCD connection; (ii) it copies the snd_una variable of the original TCP connection 632 to the snd_una, sent_max and appl_init_seq variable of the associated SCD connection 634; (iii) it writes one maximum segment size (MSS) value or the total unacknowledged (unACKed) flightsize data between snd_una and sent_max (whichever is smaller) from the original TCP connection 632 to the rmt_offer_win variable of the SCD connection 634; (iv) it creates a data link list for the SCD connection 634 by setting pointers pointing to required retransmission data; (v) it calculates new RTO timer values and loads the value back to the RTO timer of the original TCP connection 632; (vi) it enables hardware message generation as the SCD connection 634 completes retransmitting one or more segments; (vii) it enables hardware for SCD connection transmission. The TCP state machine 630 sends a message to the TCP micro engine 640 when the SCD connection completes retransmission. Once the retransmission is complete, the TCP micro engine 640 "tears down" or releases the SCD connection 634 for further retransmission usage with the same or with any of the other original TCP connections 532 that need retransmission assistance.

Figure 7:
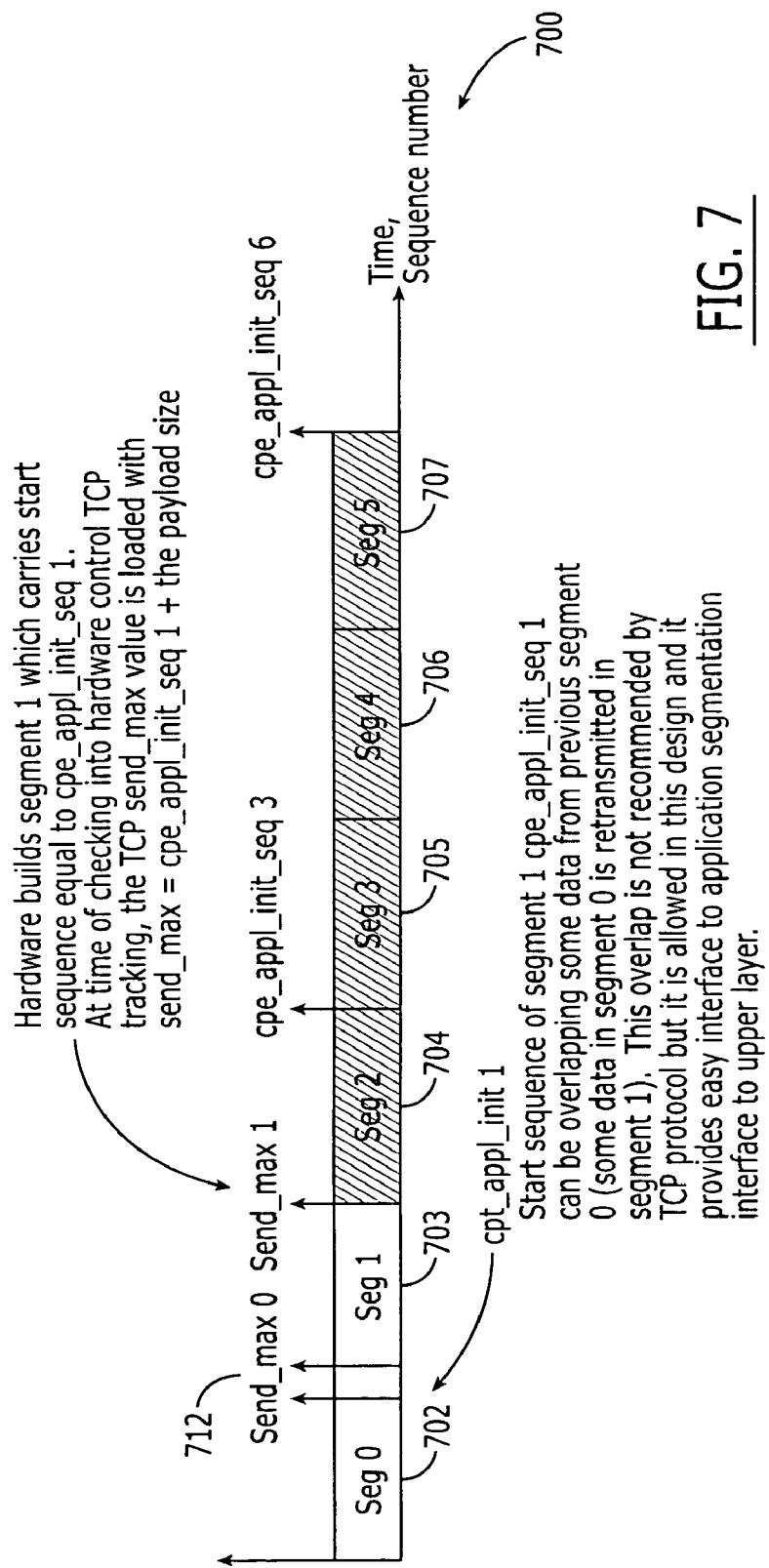
FIG. 7 is a timeline illustrating a TCP transmission and retransmission sequence using the present invention.

Timeline 700 of FIG. 7, in contrast with the timelines of FIGS. 4A and 4B, illustrates how the present invention handles transmission and retransmission of TCP segments. Similar to FIG. 4A, timeline 700 illustrates transmission of segments 0 through 5 (Seg 0 . . . . Seg 5) in sequence, as designated by blocks 702,703,704,705,706, and 707. To accomplish the transmission/retransmission of the present invention, a new internal variable, appl_init_seq #, is introduced and is used in place of the send_nxt variable. Different from the send_nxt variable, this appl_init_seq variable is used to identify the initial sequence number of the next TCP segment to be built for transmission. As shown in FIG. 7, the value of this variable is always later than or equal to the snd_max variable. Because of this feature, the present invention enables the application segmentation interface to build TCP segments prior to actual transmission and to store those TCP segments in a temporary transmission buffer as long as the total amount of data does not exceed the size of remote offer window limit.

This appl_init_seq sequence number is checked into the TCP stack for transmission tracking. The value of the appl_init_seq variable for each segment plus the data size is the new snd_max value. If the segment is without payload, then the appl_init_seq is preferably ignored by the system. The sequence number of the zero payload segment is extracted from the previously-stored snd_max value from memory. By doing this, the SCD connection can be built solely for the purpose of retransmitting TCP segments that need to be retransmitted.

More specifically, upon the sending of each respective TCP segment, the snd_max variable is updated. Thus, when segment 0 is sent, the snd_max variable 712 (designated as snd_max0 since segment 0 has already been sent) is updated to have a value equal to the first sequence number of the next segment (i.e., segment 1) that needs to be transmitted. When the TCP processor system builds and checks in segment 1, which carries a start sequence number equal to the value of variable appl_init_seq 1, for transmission, the snd_max variable is assigned a value equal to appl_init_seq 1 plus the payload size of segment 1. This process proceeds for each successful TCP segment built and transmitted.

When a TCP segment needs to be retransmitted, the snd_max variable for the original TCP connection is not changed. The snd_una value that has been ACKed back three or more times from the TCP receiver system, indicating that the next segment following that snd_una sequence number has not yet been received and needs to be retransmitted, is then used to define the appl_init_seq value for the SCD connection.

As has been and will be discussed in greater detail herein, an SCD connection is used by the TCP processor system of the present invention to retransmit in fast retransmit mode a single TCP segment, in response to three or more duplicate ACKs, when SACK tracking is not enabled. An SCD connection is also usable to retransmit in fast retransmit mode a plurality of TCP segments between a last ACKed segment and a first SACK region or between two SACK regions. A single SCD connection can be used to retransmit two groups of one or more TCP segments associated with a particular original TCP connection or two separate SCD connections may be used, one for each group of one or more TCP segments associated with a particular original TCP connection. An SCD connection is also used by the present invention to retransmit TCP segments for an associated original TCP connection after a retransmission time out condition on the original TCP connection.

Figure 8A:
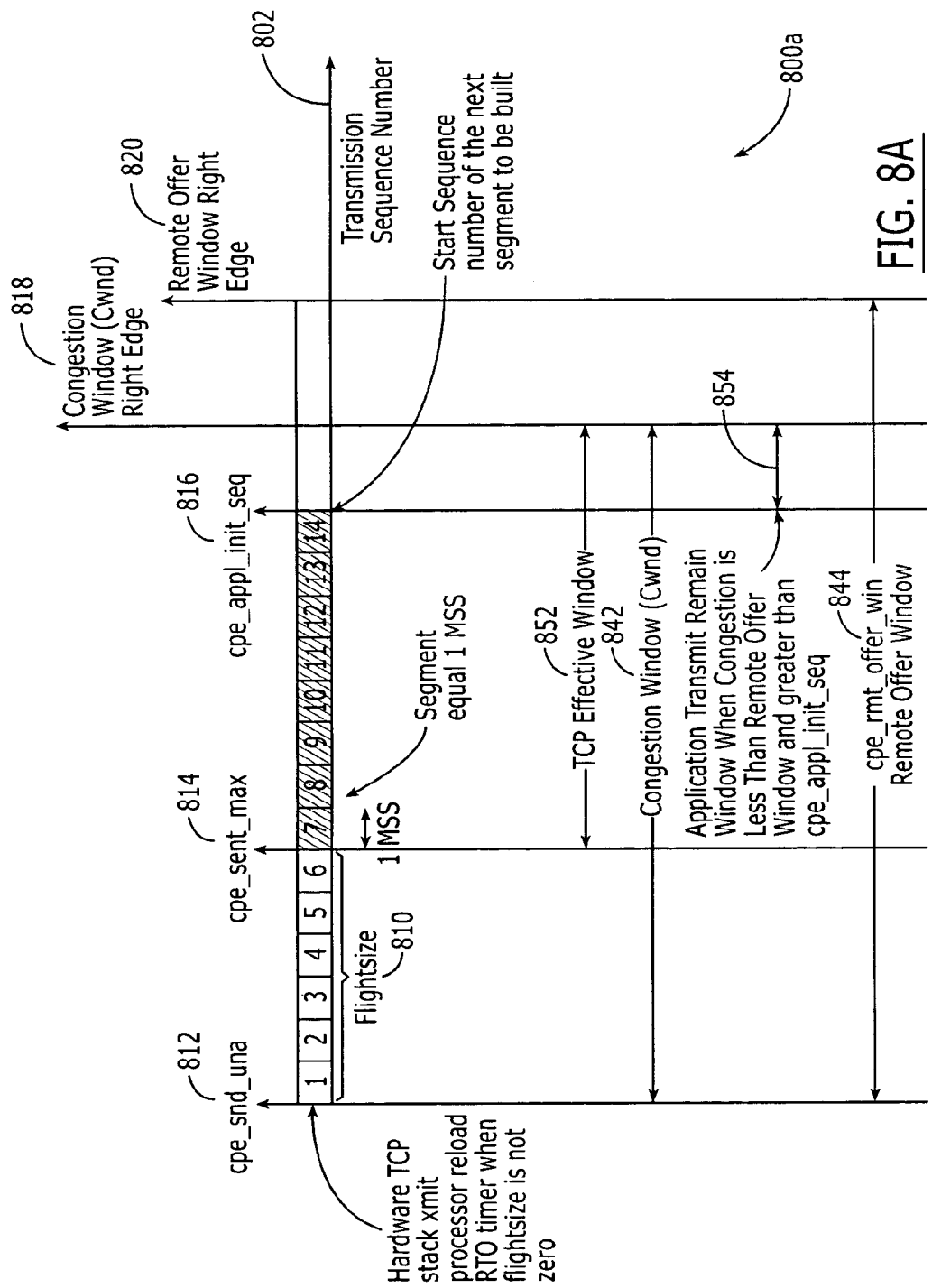
FIG. 8A is a normal transmission condition diagram using an original TCP connection of the present invention.

Turning now to FIG. 8A, a normal transmission condition diagram 800a using an original TCP connection of the present invention is illustrated. FIG. 8A illustrates the situation when a TCP connection has been established, with all TCP parameters initialized, and when TCP segments are being transmitted by the TCP processor system of the source machine and received by the TCP receiver system at the destination machine. For this example, it is assumed that SACK tracking is off, is not being used, or no SACK regions have been acknowledged. The diagram 800a includes a transmission sequence number timeline 802. As shown on the timeline 802, segment 1 through segment 6 comprise the flightsize 810 of TCP segments that have already been transmitted by the TCP processor system using the original TCP connection. Segment 7 through segment 14 represent those TCP segments that have been built by the TCP processor system but not yet transmitted on the line. The snd_una variable 812 represents the last sequence number ACKed by the TCP receiver system. The snd_max variable 814 represents the last sequence number of the last TCP segment that has already been sent and that has been "checked into" the TCP processor system. The appl_init_seq variable 816 represents the start sequence number of the next TCP segment to be built by the processor system. It should be noted here that when the TCP processor system is reset, the appl_init_seq variable 816 and the sent_max variable 814 start out as the same value but as TCP segments are built and transmitted, the appl_init_seq variable 816 gets out ahead of the sent_max variable 814, as shown in FIG. 8.

The send window for this original TCP connection uses the snd_una acknowledged value 812 as a base reference point. In this example, the congestion window 842, which is defined between the snd_una value 812 and congestion window (cwnd) right edge 818, is less than the remote offer window 844, which is defined between the snd_una value 812 and the remote offer window right edge 820. The TCP effective window 852 is defined between the sent_max value 814 and whichever is the closer of (i) the congestion window (cwnd) right edge 818 and (ii) the remote offer window right edge 820, which, in this example, is the congestion window (cwnd) right edge 818. The application transmit remain window 854 is defined as a positive value and includes whatever portion of the TCP effective window 852 that exceeds or is beyond the appl_init_seq variable 816.

Figure 8B:
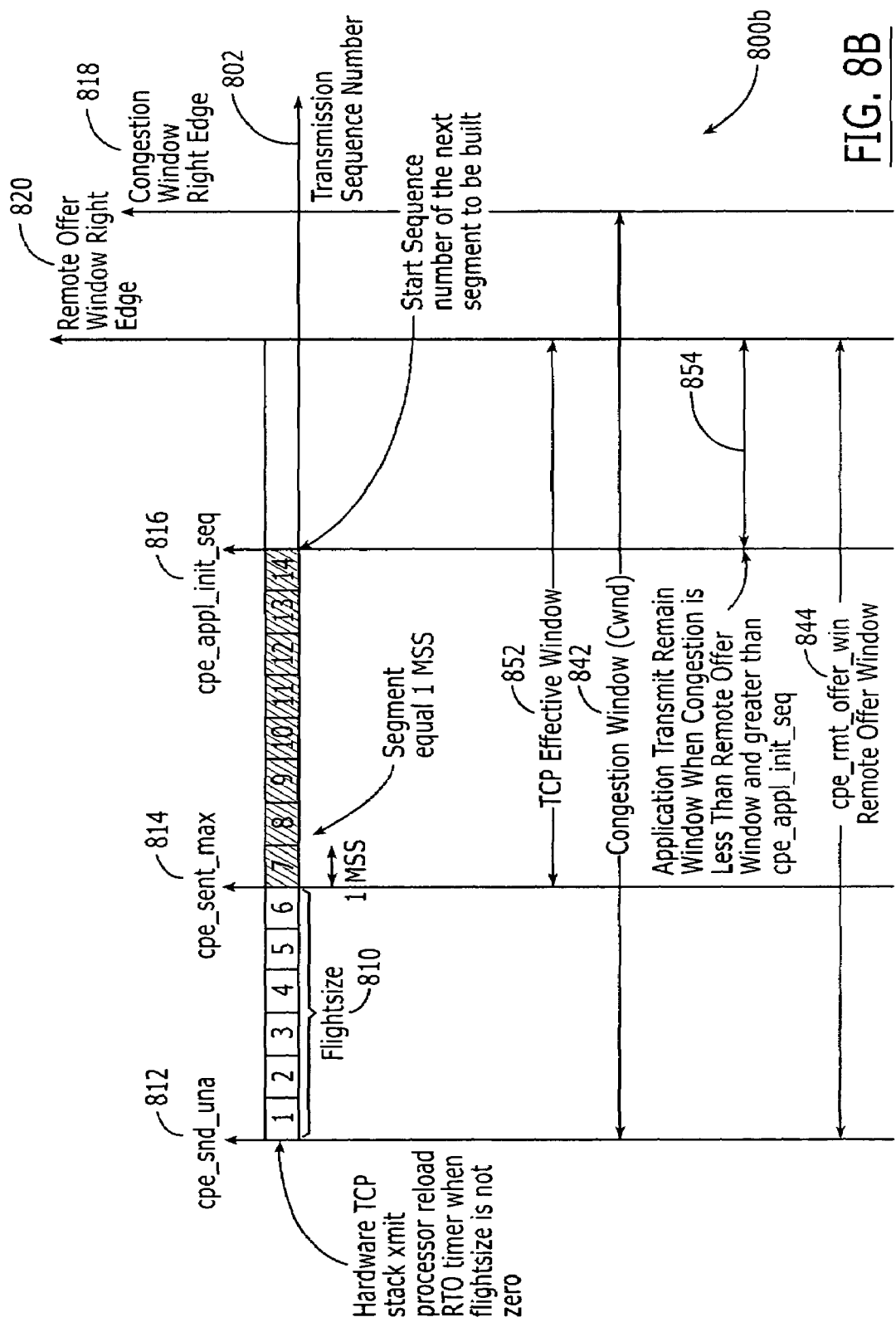
FIG. 8B is another normal transmission condition diagram using an original TCP connection of the present invention.

Turning now to FIG. 8B, a normal transmission condition diagram 800b using an original TCP connection of the present invention when the congestion window 842 is greater than the remote offer window 844 is illustrated. In this example, the congestion window 842, which is defined between the snd_una value 812 and congestion window (cwnd) right edge 818, is greater than the remote offer window 844, which is defined between the snd_una value 812 and the remote offer window right edge 820. Again, the TCP effective window 852 is defined between the sent_max value 814 and whichever is the closer of (i) the congestion window (cwnd) right edge 818 and (ii) the remote offer window right edge 820, which, in this particular example, is the remote offer window right edge 820. The application transmit remain window 854 is defined as a positive value and includes whatever portion of the TCP effective window 852 that exceeds or is beyond the appl_init_seq variable 816.

Figure 9A:
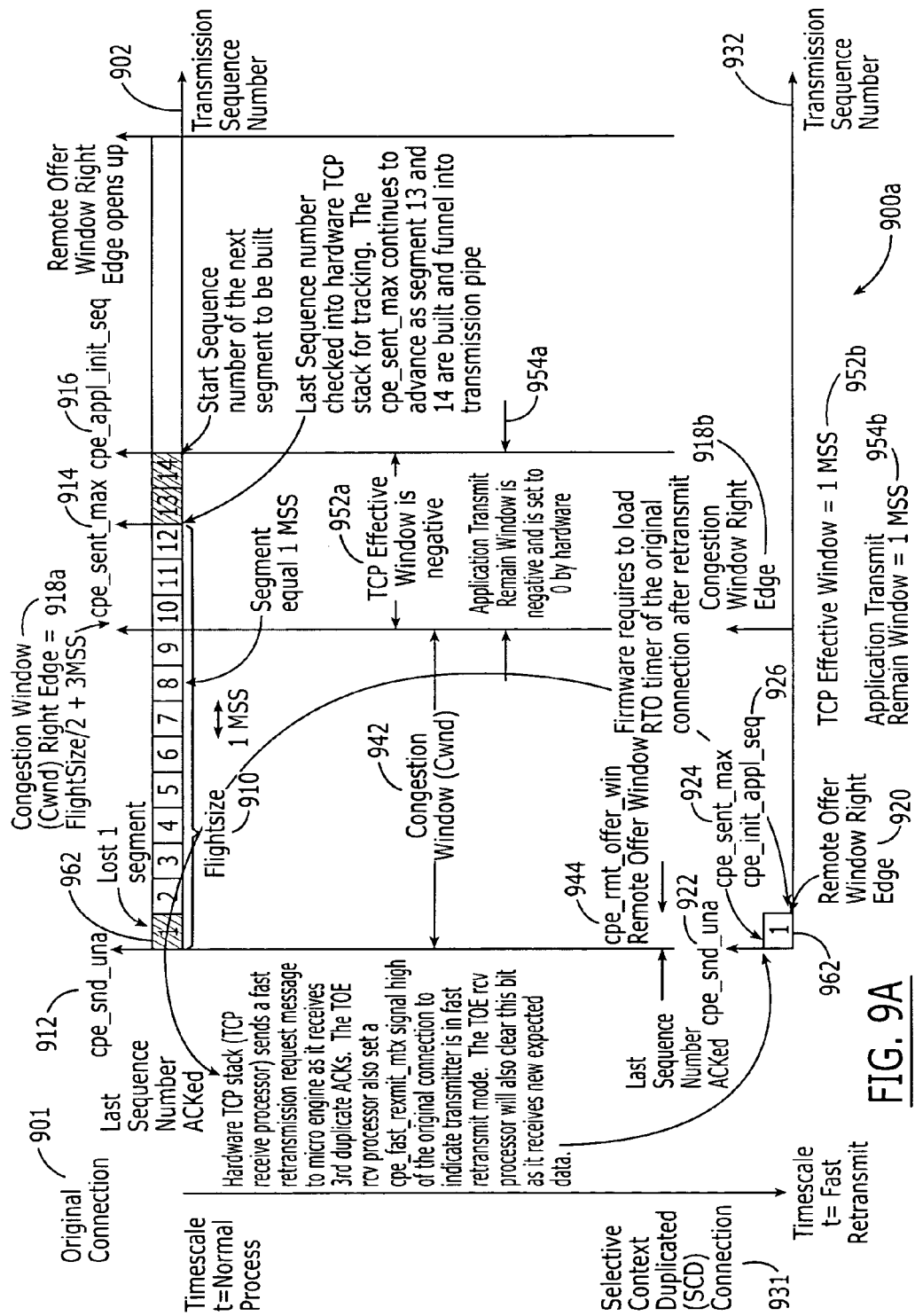
FIG. 9A is a retransmission condition diagram using an SCD connection of the present invention.

FIG. 9A now illustrates a retransmission condition diagram 900a when the present invention uses an SCD connection 931 for retransmission assistance, fast recovery condition at a third duplicate ACK received by an original connection 901. FIG. 9A illustrates the situation when an original TCP connection 901 has been established, with all TCP parameters initialized, and when TCP segments are being transmitted by the TCP processor system of the source machine and received by the TCP receiver system at the destination machine. Again, in this example, SACK tracking is off, is not being used, or no SACK regions have been acknowledged. The diagram 900a includes an original transmission sequence number timeline 902. As shown on the timeline 902, segment 1 through segment 12 comprise the flightsize 910 of TCP segments that have already been transmitted by the TCP processor system using the original TCP connection 901. Segment 13 through segment 14 represent those TCP segments that have been built by the TCP processor system but not yet transmitted on the line. The snd_una variable 912 represents the last sequence number ACKed by the TCP receiver system. The snd_max variable 914 represents the last sequence number of the last TCP segment that has already been sent and that has been "checked into" the TCP processor system. The appl_init_seq variable 916 represents the start sequence number of the next TCP segment to be built by the processor system.

In this example, when the same snd_una variable 912 has been received three times (i.e., a third duplicate ACK) the TOE receive processor sends a fast retransmission request message to the microengine to request creation of an SCD connection 931 for retransmission of the lost TCP segment 962 that has a sequence number immediately following the value of the send-una variable 912. The TOE receive processor also sets a fast_rexmit_mtx variable (not shown) associated with the original connection 901 to a "high" value to indicate that the original connection is in a fast retransmission mode. This fast_rexmit_mtx variable is reset as soon as acknowledgment of retransmitted data is received back by the original connection.

The congestion window 942 is defined between the snd_una value 912 and the congestion window (cwnd) right edge 918a. The congestion window (cwnd) right edge 918a is equal to half the flightsize plus 3 maximum segment size (MSS). In this example, because the flightsize is twelve segments, the congestion window (cwnd) right edge 918a is set to the right edge of segment 9. The TCP effective window 952a is defined between the sent_max value 914 and the congestion window (cwnd) right edge 918a, which in this example defines a negative value. Since a negative value is meaningless, the system sets the TCP effective window 952a to zero. Likewise, the application transmit remain window 954a is defined to include whatever portion of the TCP effective window 952a that exceeds or is beyond the appl_init_seq variable 916. Since a negative value is meaningless, the system also sets the application transmit remain window 954a to zero.

For the SCD connection 931, as shown on the timeline 932, the snd_una variable 922 is set to the same value as the snd_una variable 912 of the original connection 901. The remote offer window right edge 920 is set to the right edge value of the lost segment 962; thus, the remote offer window 944 for the SCD connection 931 is only one MSS, defined between the snd_una value 922 and the remote offer window right edge 920. The snd_max variable 924 and appl_init_seq variable 926 for the SCD connection 931 are set to the same value as the snd_una variable 922. The TCP effective window 952b for the SCD connection 931 is set to the size of the lost segment 962, which in this case is 1 MSS. Likewise, the application transmit remain window 954b for the SCD connection 931 is set to the size of the lost segment 962, which in this case is 1 MSS. Firmware requires that the RTO timer of the original connection 901 be reloaded after retransmission of the lost segment 962.

Figure 9B:
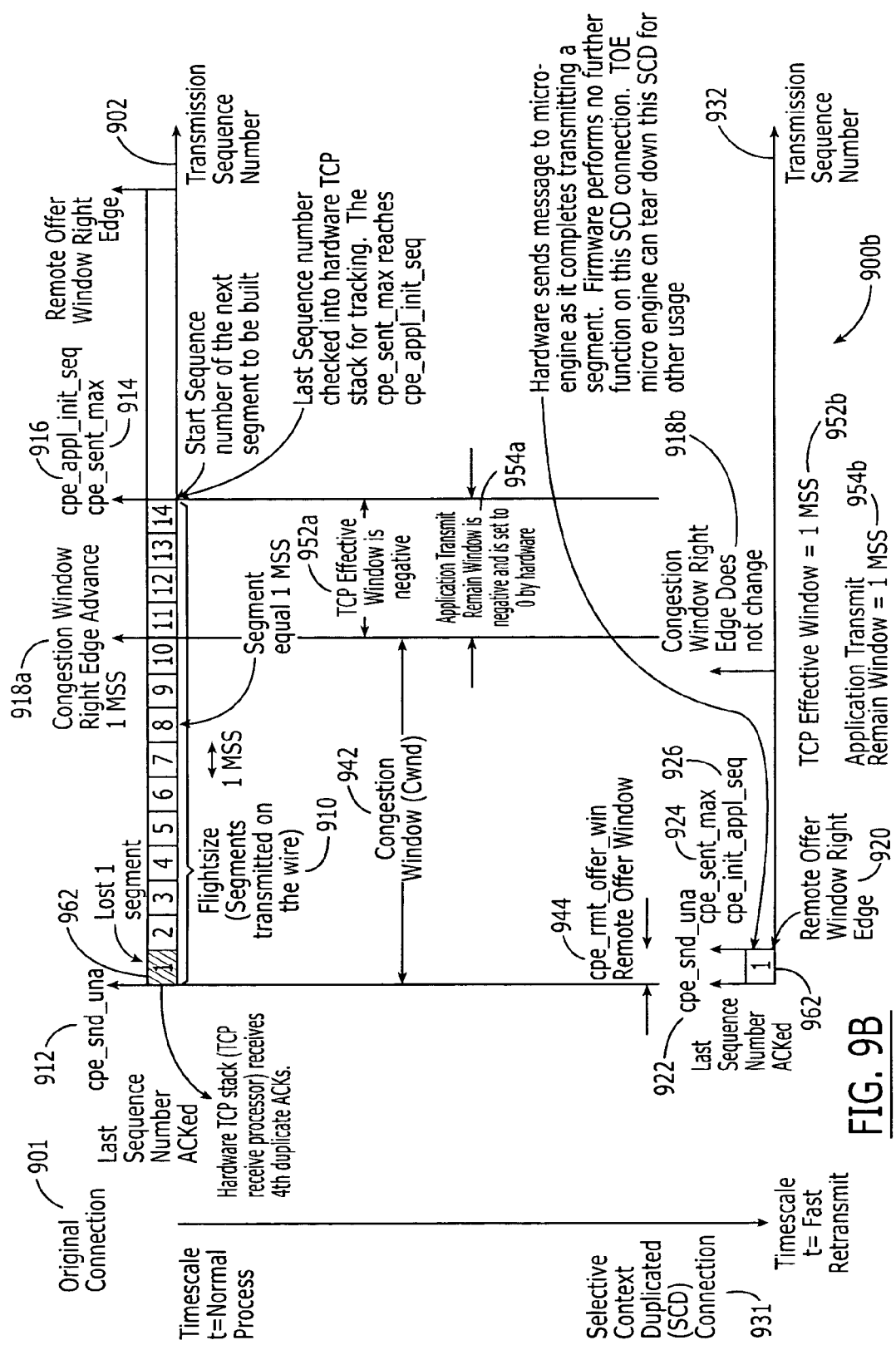
FIG. 9B is another retransmission condition diagram using an SCD connection of the present invention.

FIG. 9B illustrates a retransmission condition diagram 900b after the present invention has used an SCD connection 931 for retransmission assistance of a single lost segment 962 and after more than three duplicate ACKs have been received by the original connection 901. As shown, segments 13 and 14 have now been transmitted along the original connection 901 contemporaneously with SCD connection 931 being used to retransmit lost segment 962. Thus, the snd_max variable 914 has "caught up to" the appl_init_seq variable 916 and flightsize 910 now is equal to fourteen segments.

The congestion window 942 is still defined between the snd_una value 912 and the congestion window (cwnd) right edge 918. Once lost segment 962 has been retransmitted, the congestion window (cwnd) right edge 918 advances one MSS (from the value it was set to in FIG. 9A) because one TCP segment size has been retransmitted by the SCD connection 931. Thus, the congestion window (cwnd) right edge 918 is set to the right edge of segment 10. The TCP effective window 952a is still negative so the system sets it to zero. Likewise, the application transmit remain window 954a is negative so the system sets it to zero as well.

Turning now to the SCD connection 931, once the lost segment 962 is retransmitted, the snd_max variable 924 and appl_init_seq variable 926 for the SCD connection 931 advance to the last sequence number of the lost segment 962. The congestion window right edge 918 for the SCD connection 931 does not advance. Once the lost segment 962 is retransmitted by the SCD connection 931, hardware sends a message to the micro engine to tear down the SCD connection 931 for this particular original connection 901 to make it available to another original connection that needs retransmission assistance.

Figure 9C:
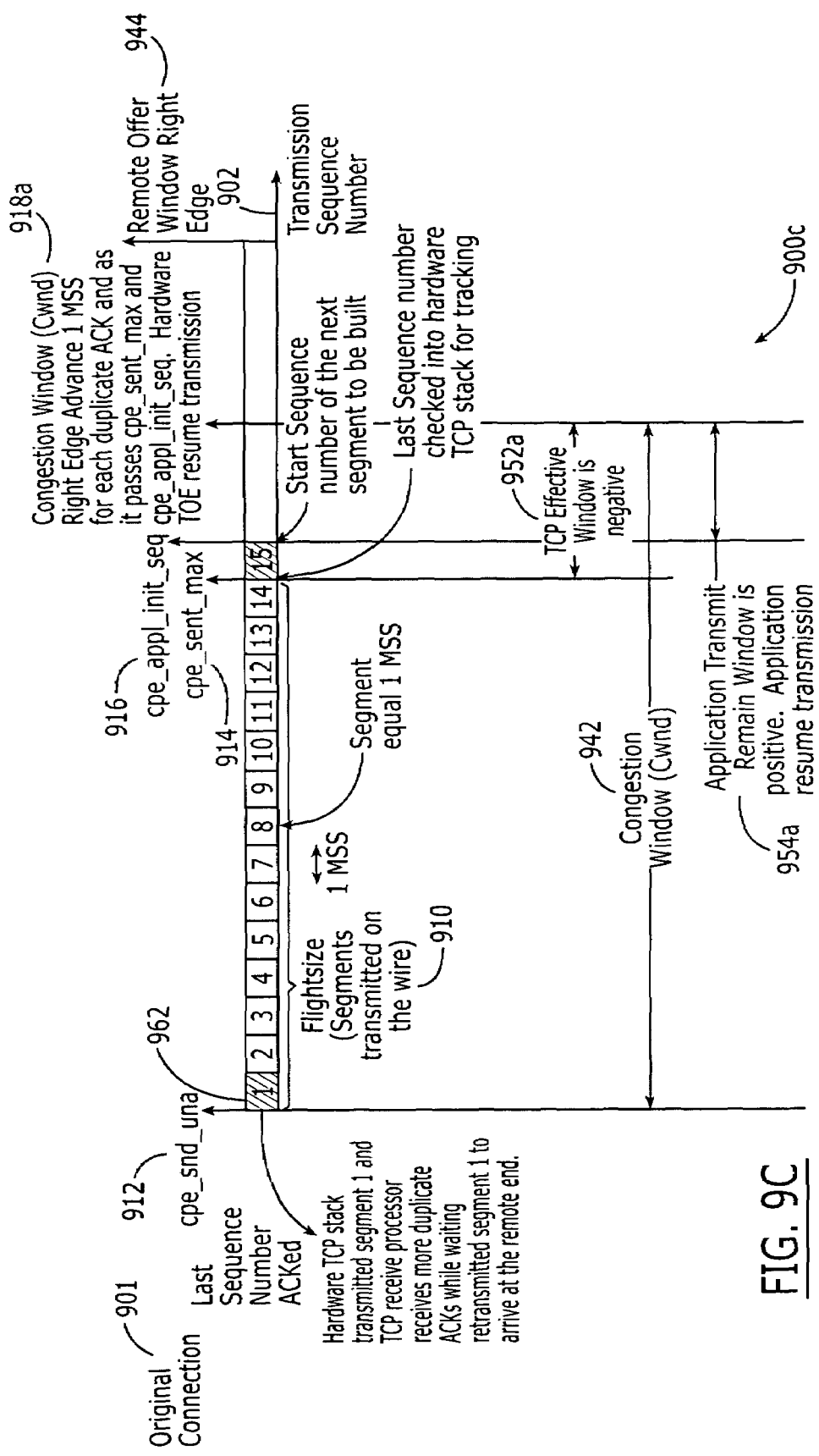
FIG. 9C is yet another retransmission condition diagram using an SCD connection of the present invention.

FIG. 9C illustrates a retransmission condition diagram 900c and the impact on the variables and segments of the original connection 901 after lost segment 962 has been retransmitted on an SCD connection and after the original SCD connection 901 has received numerous duplicate ACKs for the lost segment 962. It will be recalled that, for each duplicate ACK received, the congestion window (cwnd) right edge 918a advances one MSS. FIG. 9C illustrates the impact of the advance of the congestion window (cwnd) right edge 918a past the snd_max variable 914 and the appl_init_seq variable 916. When the congestion window 942 opens past the snd_max variable 914 and the appl_init_seq variable 916, the TCP effective window 952a becomes positive, the application transmit remain window 954a becomes positive, and the original connection 901 resumes creation of new TCP segments for transmission and resume actual transmission up to the congestion window right edge 918a value.

FIG. 10 illustrates a table 1000 of parameters 1010 that are copied from an original connection to an associated SCD connection for use in retransmission. The table 1000 includes columns for the bit size 1020 and a brief description 1030 of each corresponding parameter 1010.

FIG. 11 illustrates a table 1100 of the connection status (cnn_stat) bit format for the 32 address bits for this parameter. Column 1110 shows the bit range, column 1120 includes a brief description for the use of the bits for the corresponding bit range, and column 1130 includes a more detailed description for the use of the bits for the corresponding bit range.

Figure 12A:
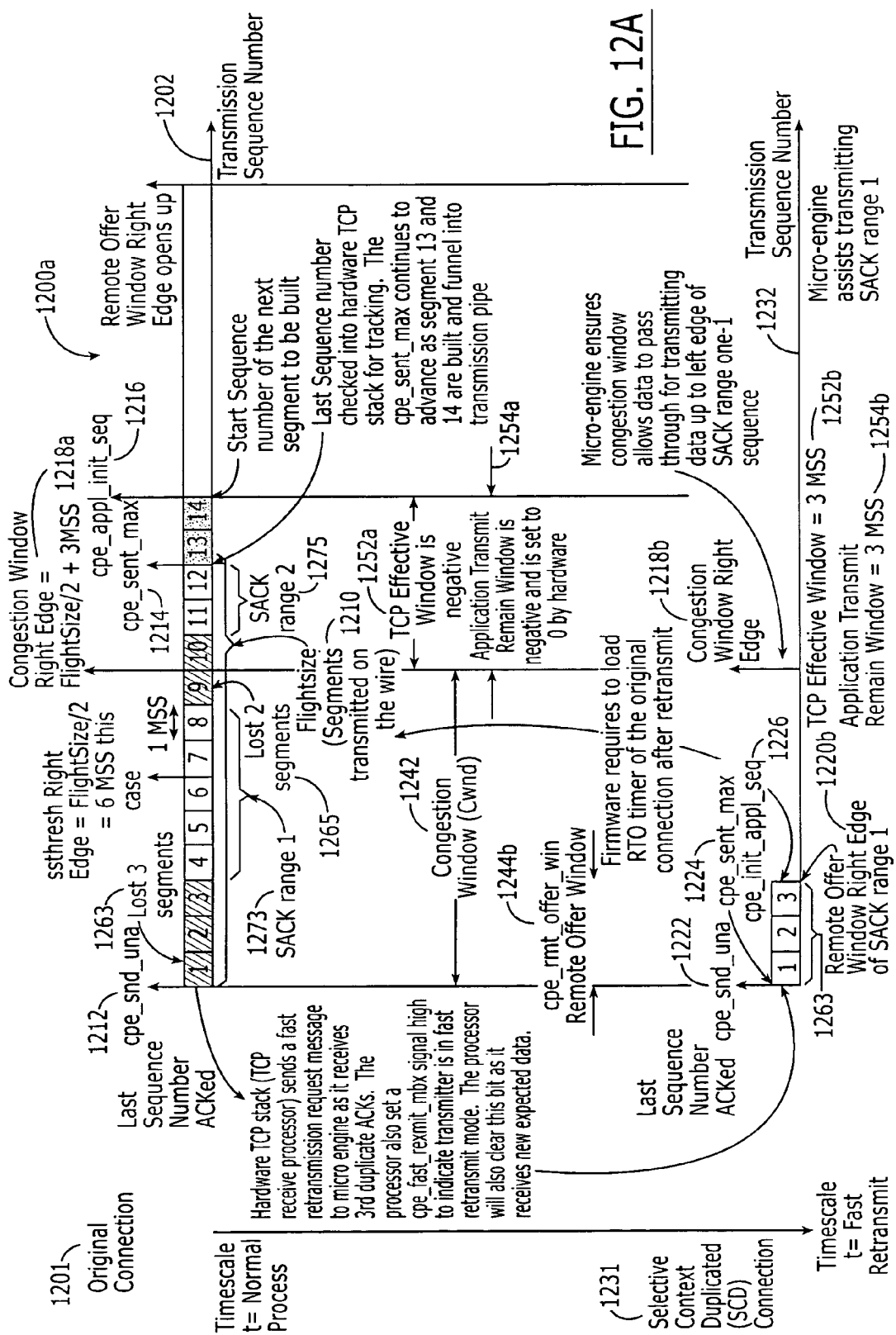
FIG. 12A is a retransmission condition diagram using an SCD connection of the present invention.

Turning now to FIG. 12A, a retransmission condition diagram 1200a illustrates use of an SCD connection 1231 for retransmission assistance, fast recovery condition at a third duplicate SACK received by an original connection 1201. FIG. 12A illustrates the situation when an original TCP connection 1201 has been established, with all TCP parameters initialized, and when TCP segments are being transmitted by the TCP processor system of the source machine and received by the TCP receiver system at the destination machine. In this example, SACK tracking is on. The diagram 1200a includes an original transmission sequence number timeline 1202. As shown on the timeline 1202, segment 1 through segment 12 comprise the flightsize 1210 of TCP segments that have already been transmitted by the TCP processor system using the original TCP connection 1201. Segment 13 through segment 14 represent those TCP segments that have been built by the TCP processor system but not yet transmitted on the line. The snd_una variable 1212 represents the last sequence number ACKed by the TCP receiver system. The snd_max variable 1214 represents the last sequence number of the last TCP segment that has already been sent and that has been "checked into" the TCP processor system. The appl_init_seq variable 1216 represents the start sequence number of the next TCP segment to be built by the processor system.

In this example, SACK range1 1273 indicates that segment 4 through segment 8 have been received. SACK range2 1275 indicates that segment 11 and segment 12 have also been received. Thus, based on the snd_una 1212 and the SACK range1 1273 values, the system can determine that three segments 1263 (segment 1 through segment 3) have been lost. Based on the SACK range1 1273 and SACK range2 1275, the system can determine that two segments 1265 (segment 9 through segment 10) have been lost. When the original connection 1202 receives the same snd_una variable 1212 three consecutive times (i.e., a third duplicate ACK) the TOE receive processor sends a fast retransmission request message to the microengine to request creation of an SCD connection 1231 for retransmission of the first set of lost TCP segments 1263 that have a sequence range immediately following the value of the send-una variable 1212 and ending with the left edge of SACK range1 1273. The TOE receive processor sets a fast_rexmit_mtx variable (not shown) associated with the original connection 1201 to a "high" value to indicate that the original connection is in a fast retransmission mode. This fast_rexmit_mtx variable is reset as soon as acknowledgment of retransmitted data is received back by the original connection 1201.

The congestion window 1242 is defined between the snd_una value 1212 and the congestion window (cwnd) right edge 1218a. The congestion window (cwnd) right edge 1218a is initially equal to half the flightsize plus 3 maximum segment size (MSS). In this example, because the flightsize is twelve segments, the congestion window (cwnd) right edge 1218a is set to the right edge of segment 9. The TCP effective window 1252a is defined between the sent_max value 1214 and the congestion window (cwnd) right edge 1218a, which in this example defines a negative value. Since a negative value is meaningless, the system sets the TCP effective window 1252a to zero. Likewise, the application transmit remain window 1254a is defined to include whatever portion of the TCP effective window 1252a exceeds or is beyond the appl_init_seq variable 1216. Since a negative value is meaningless, the system also sets the application transmit remain window 1254a to zero.

For the SCD connection 1231, as shown on the timeline 1232, the snd_una variable 1222 is set to the same value as the snd_una variable 1212 of the original connection 1201. The remote offer window right edge 1220b is set to the right edge value of the first group of lost segments 1263; thus, the remote offer window 1244b for the SCD connection 1231 is three MSS, defined between the snd_una value 1222 and the remote offer window right edge 1220b. The snd_max variable 1224 and appl_init_seq variable 1226 for the SCD connection 1231 are set to the same value as the snd_una variable 1222. The TCP effective window 1252b for the SCD connection 1231 is set to the size of the first group of lost segments 1263, which in this case is three MSS. Likewise, the application transmit remain window 1254b for the SCD connection 1231 is set to the size of the first group of lost segments 1263, which in this case is three MSS. Firmware requires that the RTO timer of the original connection 1201 be reloaded after retransmission of the first group of lost segments 1263.

Turning now to FIG. 12B, a retransmission condition diagram 1200b illustrates use of an SCD connection 1231 for retransmission assistance, fast recovery condition at a third duplicate SACK received by an original connection 1201 for retransmission of the second group of lost segments 1265.

For the SCD connection 1231, as shown on the timeline 1232, the snd_una variable 1282 is set to the same value as the snd_una variable 1212 of the original connection 1201. The remote offer window right edge 1220c is set to the right edge value of the second group of lost segments 1265; thus, the remote offer window 1244c for the SCD connection 1231 for retransmission of the second group of lost segments 1265 is two MSS, defined between the snd_una value 1282 and the remote offer window right edge 1220c. The snd_max variable 1284 and appl_init_seq variable 1286 for the SCD connection 1231 are set to the same value as the sequence number of the right edge of the SACK region1 1273. The TCP effective window 1252c for the SCD connection 1231 for retransmission of the second group of lost segments 1265 is set to the size of the second group of lost segments 1265, which in this case is two MSS. Likewise, the application transmit remain window 1254c for the SCD connection 1231 for retransmission of the second group of lost segments 1265 is set to the size of the second group of lost segments 1265, which in this case is two MSS. Firmware requires that the RTO timer of the original connection 1201 be reloaded after retransmission of the second group of lost segments 1265. The micro-engine ensures that the congestion window 1218c remains sufficiently beyond the right edge of the second group of lost segments 1265 to handle the retransmission of the second group of lost segments 1265.

Figure 13A:
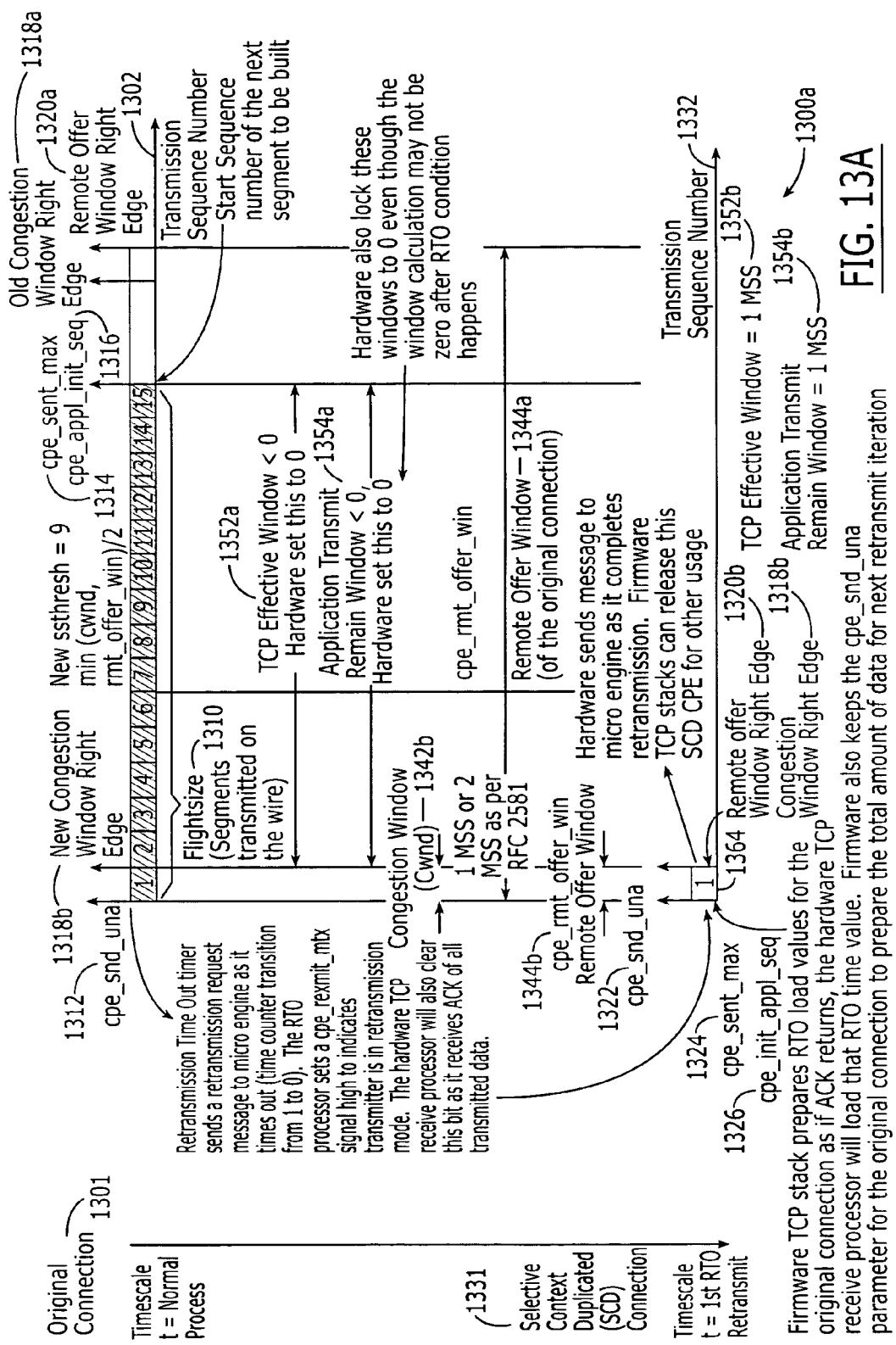
FIG. 13A is a slow start retransmission condition diagram using an SCD connection of the present invention.

Turning now to FIG. 13A, a retransmission condition diagram 1300a when the present invention uses an SCD connection 1331 for slow start retransmission assistance when there has been a retransmission timeout (RTO) condition on the original connection 1301. FIG. 13A illustrates the situation when an original TCP connection 1301 has been established, with all TCP parameters initialized, and when TCP segments have been transmitted by the TCP processor system of the source machine and received by the TCP receiver system at the destination machine. In this example, SACK tracking may be on or off—it is irrelevant here since there has been a timeout condition since the last acknowledged TCP segment. The diagram 1300a includes an original transmission sequence number timeline 1302. As shown on the timeline 1302, segment 1 through segment 15 comprise the flightsize 1310 of TCP segments that have already been built and transmitted by the TCP processor system using the original TCP connection 1301. In this example, there are no TCP segments that have been built by the TCP processor system but not yet transmitted on the line; thus, the snd_max variable 1314, which represents the last sequence number of the last TCP segment that has already been sent and that has been "checked into" the TCP processor system, and the appl_init_seq variable 1316, which represents the start sequence number of the next TCP segment to be built by the processor system, are at the same value. The snd_una variable 1312 still represents the last sequence number ACKed by the TCP receiver system before it went into time out condition.

In this example, when the RTO timer of the original connection 1301 times out (i.e., does not receive any ACKs or SACKs in a predetermined period of time), the TOE receive processor sends an RTO retransmission request message to the microengine to request creation of an SCD connection 1331 for retransmission of the TCP segments from the flightsize 1310 starting with the TCP segment that has a sequence number immediately following the value of the send-una variable 1312. The TOE receive processor also sets a fast_r-exmit_mtx variable (not shown) associated with the original connection 1301 to a "high" value to indicate that the original connection is in SCD retransmission mode. This fast_rexmit_mtx variable is reset as soon as acknowledgment of retransmitted data is received back by the original connection 1301.

Just prior to the time out condition, the congestion window of the original connection 1301 was defined between the snd_una value 1312 and the "old" congestion window (cwnd) right edge 1318a. At time out, the congestion window 1342b is set to one MSS or 2 MSS, by conventional TCP protocol. In this example, it is set to one MSS wherein the congestion window 1342b is defined between the snd_una value 1312 and the RTO congestion window right edge 1318b. At time out, the TCP effective window 1352a and the application transmit remain window 1354a both become negative and, therefore, are set to zero by the system. The remote offer window 1344a of the original connection 1301 is and remains defined between the snd_una value 1312 and the remote offer window right edge 1320a.

For the SCD connection 1331, as shown on the timeline 1332, the snd_una variable 1322 is set to the same value as the snd_una variable 1312 of the original connection 1301. The remote offer window right edge 1320b is set to the right edge value of the RTO congestion window 1342b; thus, the remote offer window 1344b for the SCD connection 1331 is only one MSS, defined between the snd_una value 1322 and the remote offer window right edge 1320b. The snd_max variable 1324 and appl_init_seq variable 1326 for the SCD connection 1331 are initially set to the same value as the snd_una variable 1322. The TCP effective window 1352b for the SCD connection 1331 is initially set to the size of the TCP segment(s) 1364 to be retransmitted first in RTO condition, which in this case is one MSS. Likewise, the application transmit remain window 1354b for the SCD connection 1331 is initially set to the size of the TCP segment(s) 1364 to be retransmitted first in RTO condition, which in this case is one MSS.

Firmware causes the TCP stack to prepare the first TCP segment 1364 for retransmission and prepares the RTO load value for the original connection 1301 as if an ACK has been returned. The hardware TCP receive processor loads the RTO time value. Firmware also keeps the snd_una value 1312 of the original connection to prepare the total amount of data for the next retransmission iteration. As soon as the segment 1364 has been retransmitted, hardware sends a message to the microengine to break down this SCD connection 1331 so that it can be used for retransmission purposes with this same original connection 1301 or with another original connection (not shown).

Figure 13B:
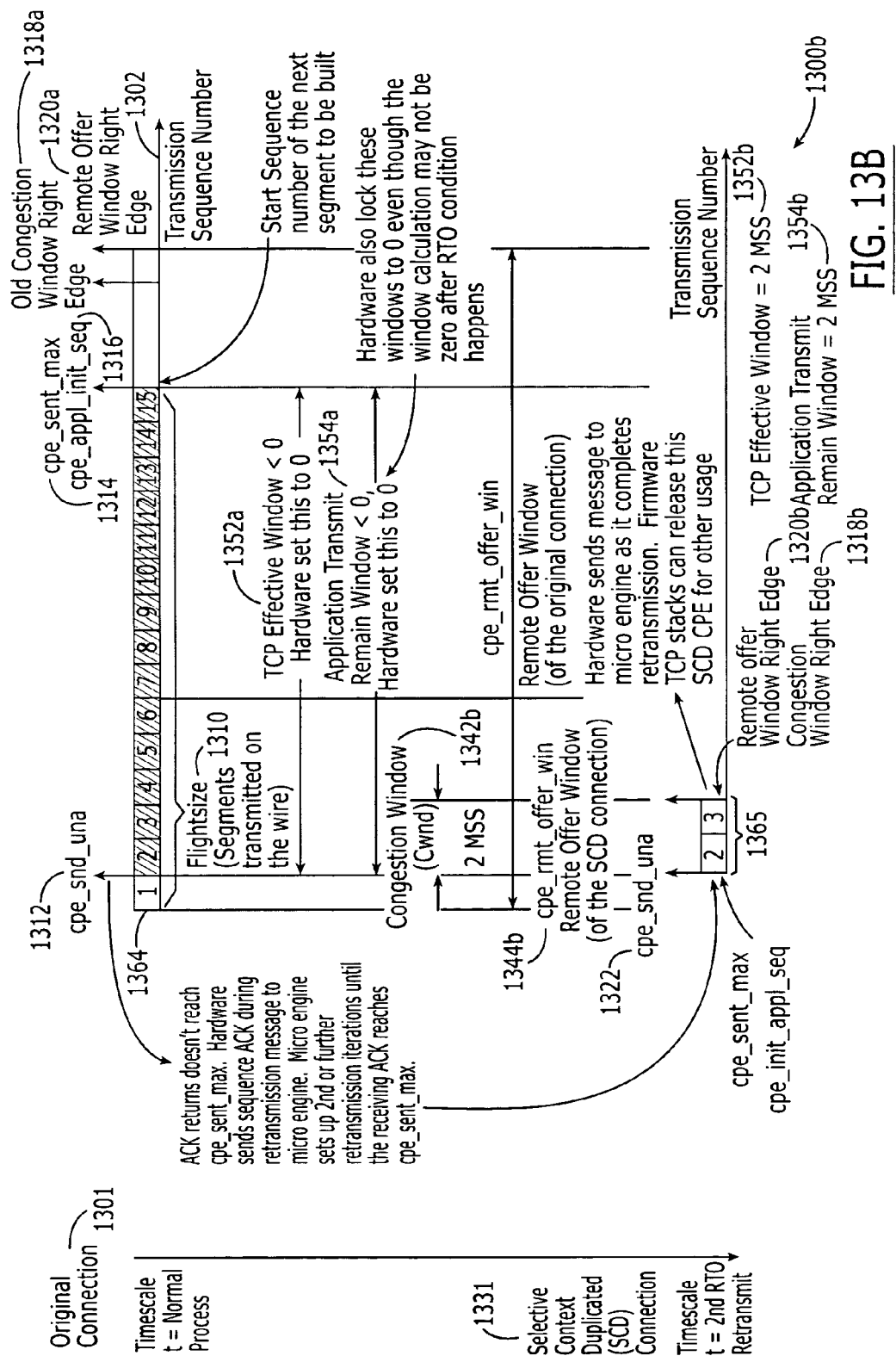
FIG. 13B is a continuing slow start retransmission condition diagram using an SCD connection of the present invention.

FIG. 13B illustrates a retransmission condition diagram 1300b showing the continuing retransmission process after segment 1364 has been retransmitted and acknowledged as received after a time out condition on the original connection 1301. When the original connection is in RTO condition, no further TCP segments are built or transmitted by the original connection 1301 until the snd_una value 1312 catches up to the sent_max value 1314. Thus, there is no further change to the appl_init_seq value 1316, the flightsize 1310, the TCP effective window 1352a of the original connection 1301, and the application transmit remain window 1354a of the original connection 1301. When an acknowledgment is received by the original connection 1301 for segment 1364, the snd_una value 1312 advances. The size of the congestion window 1342b expands by one MSS, as shown by the advance of the congestion window right edge 1318b. Hardware sends a retransmission request message to the microengine, which builds an SCD connection 1331 for RTO retransmission assistance for additional TCP segments 1365.

For the SCD connection 1331, as shown on the timeline 1332, the snd_una variable 1322 is again set to the same value as the updated snd_una variable 1312 of the original connection 1301. The remote offer window right edge 1320b is set to the right edge value of the RTO congestion window 1342b; thus, the remote offer window 1344b for this SCD connection 1331 is now two MSS, defined between the snd_una value 1322 and the remote offer window right edge 1320b. The snd_max variable 1324 and appl_init_seq variable 1326 for this SCD connection 1331 are again initially set to the same value as the snd_una variable 1322. The TCP effective window 1352b for this SCD connection 1331 is set to the size of the TCP segment(s) 1365 to be retransmitted in RTO condition, which in this case is two MSS. Likewise, the application transmit remain window 1354b for this SCD connection 1331 is set to the same size, which in this case is two MSS.

Firmware causes the TCP stack to prepare the second TCP segments 1365 for retransmission and prepares the RTO load value for the original connection 1301 as if an ACK has been returned. The hardware TCP receive processor loads the RTO time value. Firmware also keeps the snd_una value 1312 of the original connection to prepare the total amount of data for the next retransmission iteration. As soon as the segments 1365 have been retransmitted, hardware sends a message to the microengine to break down this SCD connection 1331 so that it can be used for retransmission purposes with this same original connection 1301 or with another original connection (not shown). This process will repeat until all TCP segments from the flightsize 1310 have been retransmitted. The size of the congestion window 1342b for the SCD connection 1331 is sized and can be expanded based on conventional TCP protocol for slow start retransmission in an RTO condition.

Improved Low-memory TOE Window Calculator

The processing of TCP/IP data traffic utilizes a significant amount of a server's processing resources. Due to the reality that data communication speeds have increased faster than processor speeds, a resulting problem is that processors, which are primarily designed for processing functions and not I/O functions, have developed significant trouble keeping up with and maintaining data flow through current network systems. A significant result of this problem is that TCP/IP data flow is processed at a slower rate than the speed of the network upon which the data is transmitted.

The fore-mentioned problem has been remedied by the use of TCP Offload Engine (TOE) technology. Within a communications network, a TOE assumes the function of translating all or specific parts of a TCP/IP transmission. Conventional TOE technology takes advantage of known software extensions to existing TCP/IP stacks, wherein these extensions allow for the use of hardware data planes that can be realized on TOE Network Interface Cards (TNICs).

The primary purpose for TCP is to provide a reliable host-to-host protocol between hosts in packet-switched computer communication networks. TCP has the further capability to recover information from data that is damaged, lost, duplicated, or delivered out of order. The ability to recover data is achieved by TCP assigning a sequence number to each transmitted data packet, and requiring a positive acknowledgment (ACK) from the receiving system. If the ACK is not received within a determined timeout interval the data packet is retransmitted. At the receiver, the sequence numbers are used to correctly order segments that may be received out of order and to eliminate duplicates. Damage is handled by adding a checksum to each segment transmitted, checking it at the receiver, and discarding damaged segments.

TCP further provides a means for a receiving system to govern the amount of data that is transmitted by a sender. This aspect is accomplished by returning a "window" with every ACK, wherein the window indicates an acceptable range of sequence numbers beyond the last segment successfully received. The window indicates an allowed number of data packets that the sender may transmit before receiving further permission to transmit additional data. A window's primary function is that of controlling the congestion of transmitted data. A network connection will have a bottleneck somewhere wherein the transmitted data can only be handled so fast. If the transmission of data occurs too fast, the bottleneck will be surpassed; thus, resulting in lost data unless the bottleneck is equal to the transmitting speed of the transmitting host. A TCP window throttles the transmission speed to a level where congestion and data loss do not occur.

In order to properly maintain a TCP connection, several variables are conventionally utilized to accomplish the foreseen features of a TCP transmission. The TCP transmission variables are stored in a transmission connection record called a Transmission Control Block (TCB). Among the variables stored in the TCB are the local and remote socket numbers, the security and precedence of the connection, pointers to a user's send and receive buffers, pointers to the retransmit queue and to the current segment. Further, several variables that relate to the send and receive sequence numbers of a transmission are stored in the TCB.

TCP provides for many differing variables that may be used in order to accomplish particular goals provided for by the protocol. For example, send sequence variables of TCP include:

SND_UNA—send acknowledged.
SND_NXT—send next, a pointer that is used to point to particular transmission or retransmission data.
SND_WND—send window (32 bits) (31 bits is maximum remote offer window size).
SND_MAX—maximum sequence number plus one, which is being sent to network (32 bits).
SND_WL1—records the sequence number of the last segment used to update SND_WND (32 bits).
SND_WL2—records the acknowledged number of the last segment used to update SND_WND (32 bits).

Within conventional TCP connections the SND_NXT command protocol is stored in conjunction with the SND_WND command in order to implement a segmentation window calculating process. The next transmission bit utilized by the segmentation unit is the SND_NXT command. Before conventional retransmission, the SND_NXT is shifted back before SND_MAX.

A check to see if a window should be updated is accomplished in the instance that the SND_WND is an offset from the SND_UNA, wherein the value for SND_WND is updated when a segment contains new data and the SND_WL1 is before the start sequence value of the segment that updates the window at this point. In the instance that a segment does not contain new data, then SND_WL1 will equal the start sequence number of the segment. Further, the segment will acknowledge the new data and SND_WL2 will precede the segment ACK sequence number of the segment.

The value for SND_WND is also updated in the instance that a segment does not contain any new data and the segment does not acknowledge new data in addition to the advertised send window being a larger SND_WND than the current SND_WND. The fore-mentioned parameters are utilized to track the connection of a TCP retransmission queue in addition to the amount of data being transmitted within the connection. A further purpose of the fore-mentioned parameters is to aid in the prevention of old segment data from affecting the current send window since, as mentioned above, the SND_WND is an offset from the SND_UNA value.

Current TCP configurations that support thousands of connections cause systems that utilize the above-mentioned parameters to maintain large retransmissions queues for the high number of connections. The present invention in addition to providing an independent connection for retransmission of data, does not utilize the SND_NXT protocol. In the present invention, a TOE transmission window is calculated based upon using the SND_UNA value as a reference. Further, the present invention does not store the values for SND_WND, SND_NXT, SND_WL1 and SND_WL2. A window is recalculated each time a TCP connection has data to transmit; thus, resulting in a significant saving of system memory.

A particular result of such a window-based flow control scheme is that a system can fall victim to a condition known as the silly window syndrome. Silly window syndrome occurs when small amounts of data are exchanged across a connection instead of full-sized segments. The syndrome can be caused at either end of a TCP connection. For example, instead of waiting until a larger window could be advertised, a receiver can advertise small windows to a transmitter. Also, instead of waiting for additional data to send a larger segment, a sender can transmit small amounts of data to a receiver.

A remedy for silly window syndrome is to have the receiver not advertise small windows. The normal algorithm is for the receiver not to advertise a larger window than it is currently advertising until the window can be increased by either one full-sized segment or by one-half the receiver's buffer space, whichever is smaller. Accordingly, sender avoidance of silly window syndrome is accomplished by not transmitting a data packet unless a full-sized segment can be sent, at least one-half of the maximum sized window that the receiving party has ever advertised can be sent, or all remaining data can be sent.

Aspects of the present invention provide a TCP transmission and retransmission connection to be the same, wherein they are identified by one identifier bit between the two connections. Additionally, the present invention can be implemented within systems that do not support or maintain the SND_NXT command protocol or that do not use the SND_NXT parameter for retransmission purposes. Silly window condition is also controlled within embodiments of the present invention. This aspect is accomplished in conjunction with the masking of all negative window results by the forcing of the results of either condition to zero by the present invention. Lastly, outputs of the present invention are utilized within application segmentation processing interfaces.

The present invention provides two channels for window calculation requests in addition to having at least three stages of data processing for embodiments of the present invention. These processing stages include a parameter querying stage, an effective window calculating stage, and an application transmit remain window calculation.

Figure 14:
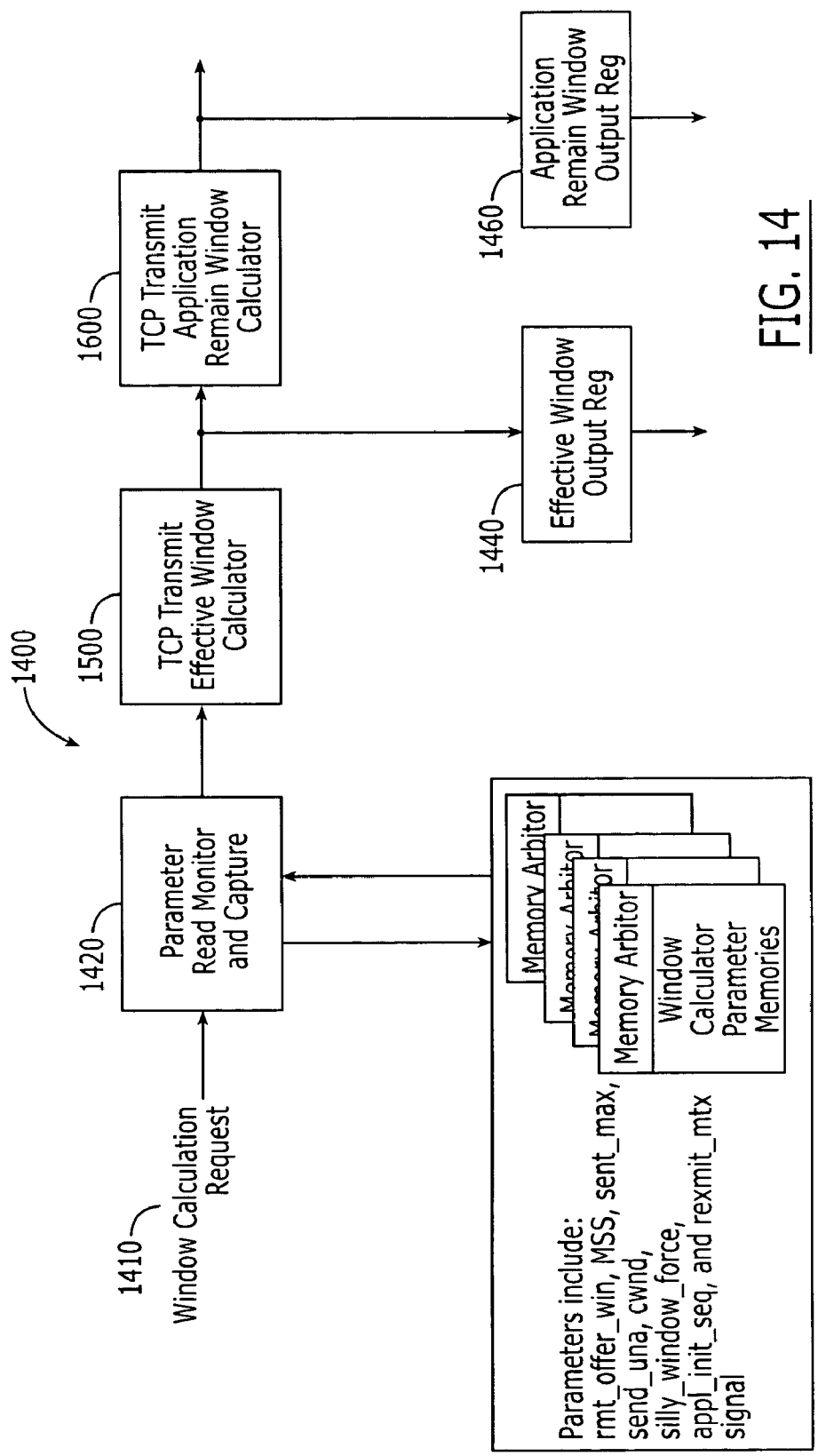
FIG. 14 is a flowchart for a TCP window calculator of the present invention.
Figure 15:
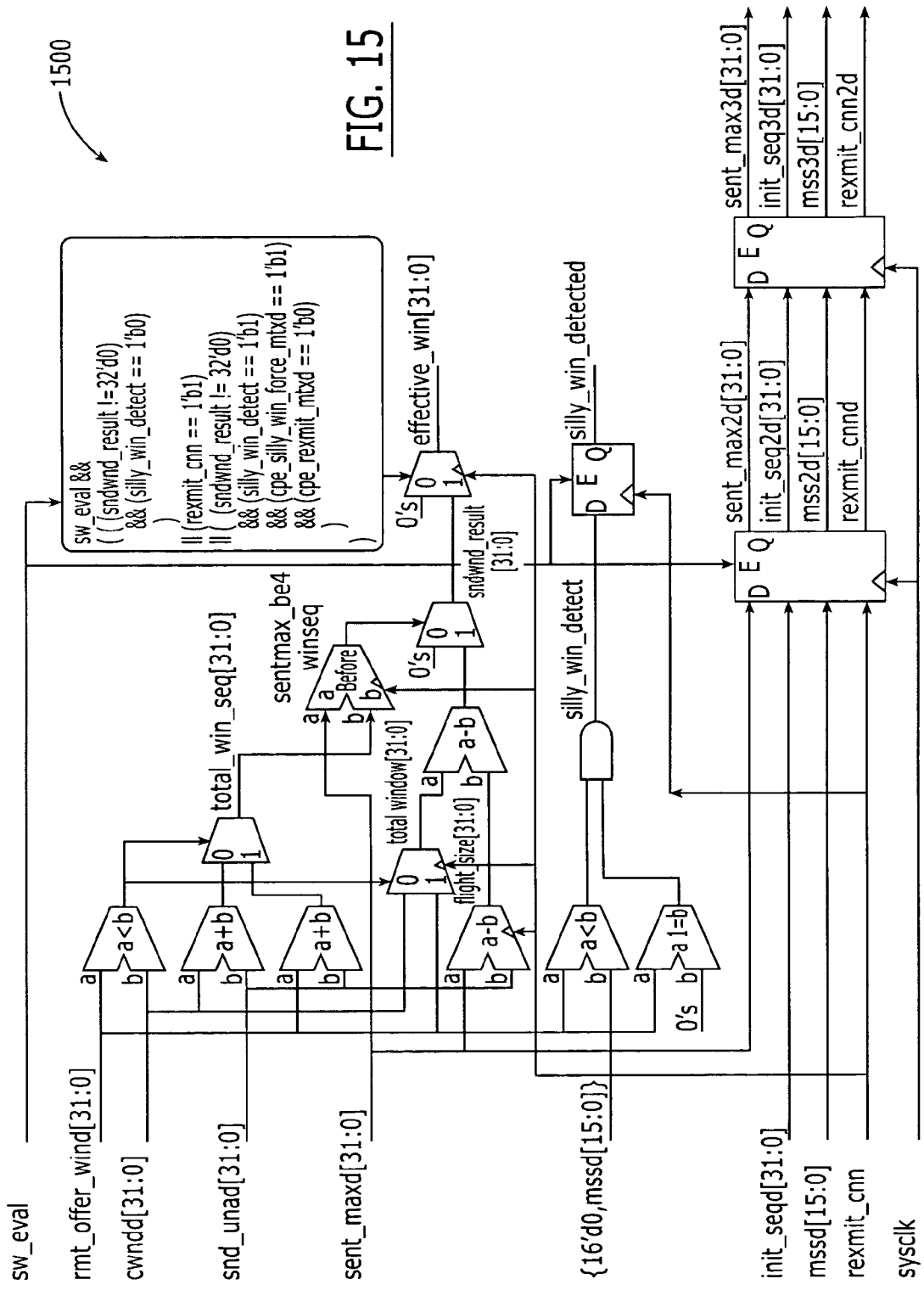
FIG. 15 is a schematic of an exemplary TCP transmit effective window calculator of the present invention.
Figure 16:
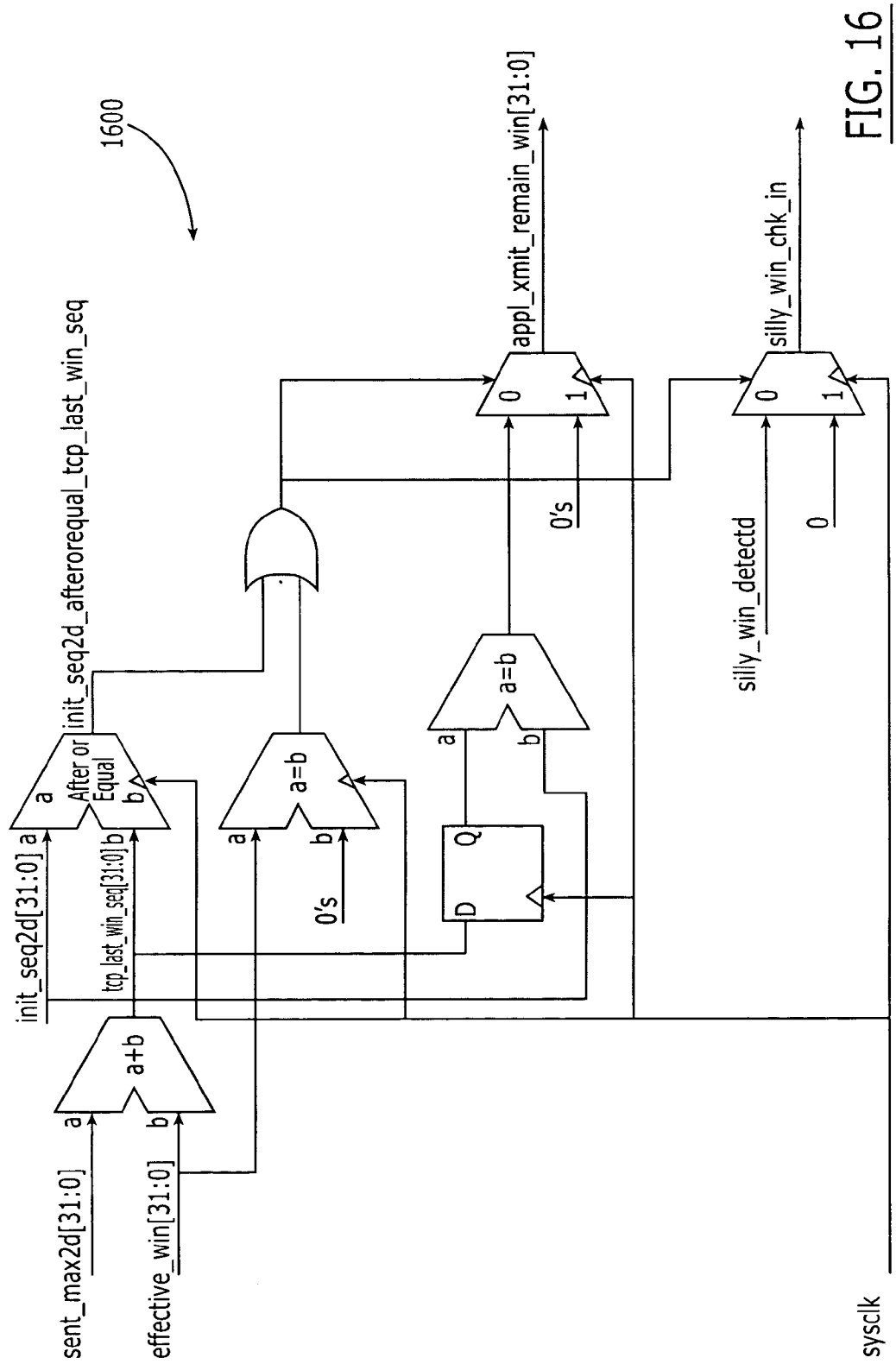
FIG. 16 is a schematic of an exemplary TCP transmit application remain window calculator of the present invention.

As illustrated in the flowchart 1400 of FIG. 14, when a send window calculator receives 1410 a request from an input channel, the calculator reads 1420 all of the required parameters of a request before handing the request off to a TCP transmit effective window calculator 1500 stage. An exemplary TCP transmit effective window calculator 1500 that can be implemented in embodiments of the present invention is illustrated in FIG. 15. Still referring to FIG. 14, once the transmit effective window calculator 1500 has processed the request, the resulting data is handed off to an effective window output register 1440 and a TCP transmit application remain window calculator 1600 stage. An exemplary TCP transmit application remain window calculator 1600 that can be implemented in embodiments of the present invention is illustrated in FIG. 16. Still referring to FIG. 14, the resultant from the TCP transmit application remain window calculator 1600 is thereafter transmitted to an application remain window output register 1460.

As mentioned above, the TOE transmission window of the present invention is calculated based upon using the SND_UNA value as a reference parameter. Further, embodiments of the present invention have no need to review the above-mentioned three conditions that are used to check if a window should be updated. Accordingly, since the present invention has no need to review the updating conditions, there is no need to store the values for the SND_WL1 And SND_WL2 parameters that are conventionally used to assist in the above-mentioned window updating process. Thus, aspects of the present invention provide for the recalculation of the SND_WND every time the system performs a transmission or retransmission without the use of large amounts of system memory.

The input parameter protocols for the TCP transmission window calculator of FIG. 14 are displayed in table 1700 of FIG. 17. The resulting outputs for the TCP transmission window calculator of FIG. 14 for two clock cycles, three clock cycles and 5 clock cycles are shown in tables 1800, 1900, and 2000 of FIGS. 18, 19, and 20, respectively.

Figure 21:
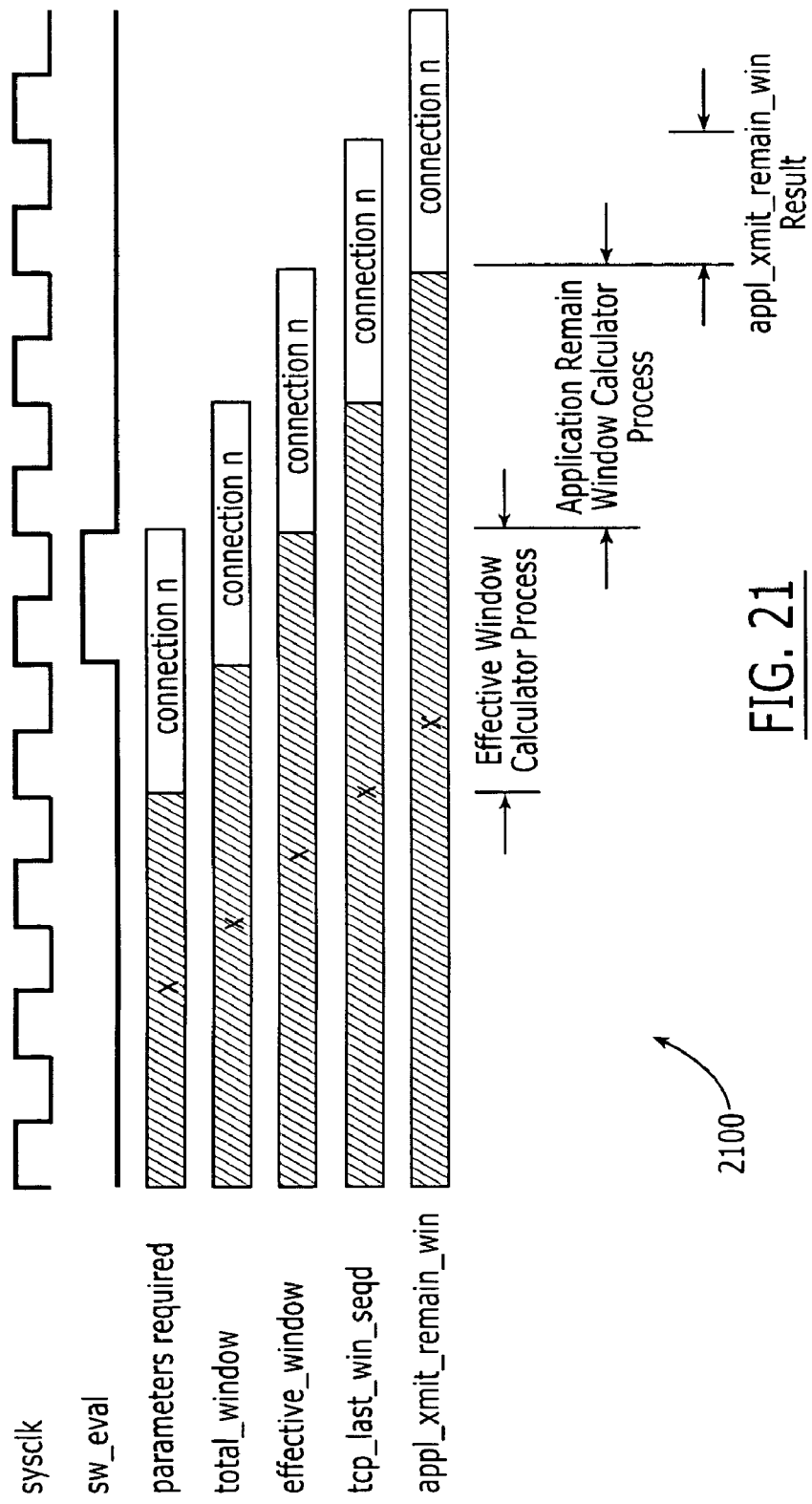
FIG. 21 is a clock sequence diagram illustrating the timing of the TCP window calculator of FIG. 14.

FIG. 21 is an illustration 2100 of the timing of the processes of the transmission window calculator in regard to a system clock timing means. As mentioned above, negative transmission window results (i.e., silly window syndrome results) are automatically forced to zero within embodiments of the present invention.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

I claim:

1. In a processor system for managing TCP communications, the processor system managing an original TCP connection with a TCP receiving system, the original TCP connection having transmission and reception characteristics, a method of fast retransmission of one or more contiguous TCP segments preceding a SACK region of TCP segments, comprising:

determining that the one or more contiguous TCP segments previously transmitted on the original connection to the TCP receiving system need to be retransmitted;

establishing a selective context duplicated connection with the TCP receiving system, the selective context duplicated connection having similar transmission characteristics as the original TCP connection;

retransmitting the one or more contiguous TCP segments to the TCP receiving system using the selective context duplicated connection; and maintaining the original TCP connection for on-going transmission of additional TCP segments to the TCP receiving system and for receipt of communications back from the TCP receiving system responsive to the one or more contiguous TCP segments retransmitted on the selective context duplicated connection.

2. The method of claim 1 wherein the step of determining is responsive to receipt by the processor system of a selective acknowledgment (SACK) from the TCP receiving system, the SACK identifying the one or more contiguous TCP segments not yet received by the TCP receiving system that lie between a last acknowledged TCP segment and the SACK region.

3. The method of claim 2 wherein the one or more contiguous TCP segments are defined between a left edge sequence number corresponding to the sequence number of the last acknowledged TCP segment and a right edge sequence number corresponding to the sequence number just prior to the SACK region.

4. The method of claim 1 wherein the reception characteristics of the selective context duplicated connection are disabled.

5. The method of claim 1 wherein the reception characteristics of the original TCP connection are not used to define the selective context duplicated connection.

6. The method of claim 1 wherein the original TCP connection and the selective context duplicated connection are linked together by means of a TCP micro engine.

7. The method of claim 1 further comprising the step of calculating a new RTO timer for the one or more contiguous TCP segments that are retransmitted using the selective context duplicated connection and assigning the value of the RTO timer to the original TCP connection.

8. The method of claim 1 wherein the on-going transmission of additional TCP segments to the receiving TCP system using the original TCP connection occurs contemporaneously with the step of retransmitting the one or more contiguous TCP segments to the TCP receiving system using the selective context duplicated connection.

9. The method of claim 1 wherein the processor system includes a TCP state machine and a TCP micro engine.

10. The method of claim 9 wherein the step of establishing the selective context duplicated connection with the TCP receiving system is performed by the TCP micro engine after receipt of a retransmission assistance request from the TCP state engine.

11. The method of claim 9 wherein the selective context duplicated connection is closed by the TCP micro engine after the one or more contiguous TCP segments are retransmitted to the TCP receiving system by the TCP state machine.

12. The method of claim 1 wherein the selective context duplicated connection is closed as soon as the one or more contiguous TCP segments are retransmitted to the TCP receiving system.

13. The method of claim 12 wherein the transmission characteristics of the selective context duplicated connection are reset and the selective context duplicated connection is made available to the processor system for retransmission use with another original TCP connection.

14. The method of claim 1 further comprising the step of creating a data link list for the selective context duplicated connection with pointers pointing to data that needs to be retransmitted.

15. The method of claim 14 wherein the data that needs to be retransmitted is included in the one or more contiguous TCP segments that are retransmitted.

16. The method of claim 1 further comprising, after determining that the one or more contiguous TCP segments need to be retransmitted, calculating a congestion window size for the original TCP connection.

17. The method of claim 16 wherein the selective context duplicated connection is unaffected by the congestion window size of the original TCP connection.

18. In a processor system for managing TCP communications, the processor system managing an original TCP connection with a TCP receiving system, the original TCP connection having transmission, and reception characteristics, a method of fast retransmission of one or more contiguous TCP segments, comprising:
   determining that the one or more contiguous TCP segments previously transmitted on the original TCP connection to the TCP receiving system need to be retransmitted, the one or more contiguous TCP segments located between first and second SACK regions of TCP segments;
   establishing a selective context duplicated connection with the TCP receiving system, the selective context duplicated connection having similar transmission characteristics as the original TCP connection;
   retransmitting the one or more contiguous TCP segments to the TCP receiving system using the selective context duplicated connection; and
   maintaining the original TCP connection for on-going transmission of additional TCP segments to the TCP receiving system and for receipt of communications back from the TCP receiving system responsive to the one or more contiguous TCP segments retransmitted on the selective context duplicated connection.

19. The method of claim 18 wherein the step of determining is responsive to receipt by the processor system of two selective acknowledgments (SACKs) from the TCP receiving system, the two SACKs identifying the first and second SACK regions, respectively, and wherein the one or more contiguous TCP segments that need to be retransmitted are between the first and second SACK regions.

20. The method of claim 19 wherein the one or more contiguous TCP segments have a left edge sequence number corresponding to the last sequence number of the first SACK region and a right edge sequence number corresponding to the sequence number just prior to the second SACK region.

21. The method of claim 18 wherein the reception characteristics of the selective context duplicated connection are disabled.

22. The method of claim 18 wherein the reception characteristics of the original TCP connection are not used to define the selective context duplicated connection.

23. The method of claim 18 wherein the original TCP connection and the selective context duplicated connection are linked together through a TCP micro engine.

24. The method of claim 18 further comprising the step of calculating a new RTO timer for the one or more contiguous TCP segments that are retransmitted by the selective context duplicated connection and loading the value of the RTO timer to the original TCP connection.

25. The method of claim 18 wherein the on-going transmission of additional TCP segments to the TCP receiving system using the original TCP connection occurs contemporaneously with the step of retransmitting the one or more contiguous TCP segments to the TCP receiving system using the selective context duplicated connection.

26. The method of claim 18 wherein the processor system includes a TCP state machine and a TCP micro engine.

27. The method of claim 26 wherein the step of establishing the selective context duplicated connection with the TCP receiving system is performed by the TCP micro engine after receipt of a retransmission assistance request from the TCP state engine.

28. The method of claim 26 wherein the selective context duplicated connection is closed by the TCP micro engine as soon as the one or more contiguous TCP segments are retransmitted to the TCP receiving system by the TCP state machine.

29. The method of claim 18 wherein the selective context duplicated connection is closed as soon as the one or more contiguous TCP segments are retransmitted to the TCP receiving system.

30. The method of claim 29 wherein the transmission characteristics of the selective context duplicated connection are reset and the selective context duplicated connection is made available to the processor system for retransmission use with another original connection.

31. The method of claim 18 further comprising the step of creating a data link list for the selective context duplicated connection with pointers pointing to data that needs to be retransmitted.

32. The method of claim 31 wherein the data that needs to be retransmitted is included in the one or more contiguous TCP segments that are retransmitted.

33. The method of claim 18 further comprising, after determining that the one or more contiguous TCP segments need to be retransmitted, calculating a congestion window size for the original TCP connection.

34. The method of claim 33 wherein the selective context duplicated connection is unaffected by the congestion window size of the original TCP connection.

* * * * *